United States Patent [19]
Krisbergh et al.

[11] Patent Number: 5,999,970
[45] Date of Patent: Dec. 7, 1999

[54] ACCESS SYSTEM AND METHOD FOR PROVIDING INTERACTIVE ACCESS TO AN INFORMATION SOURCE THROUGH A TELEVISION DISTRIBUTION SYSTEM

[75] Inventors: Harold M. Krisbergh, Rydal; David E. Wachob, Elkins Park, both of Pa.; Joseph E. Augenbraun, Princeton, N.J.; Jae Hea Edward Lee, Roslyn, Pa.

[73] Assignee: World Gate Communications, LLC, Trevose, Pa.

[21] Appl. No.: 08/630,397

[22] Filed: Apr. 10, 1996

[51] Int. Cl.$^6$ .................................................. H04N 7/173
[52] U.S. Cl. ........................... 709/217; 345/327; 348/12
[58] Field of Search ............................. 348/6, 7, 10, 12; 455/3.1, 5.1, 6.1; 345/327; 709/217–219; H04N 7/10

[56] References Cited

U.S. PATENT DOCUMENTS

| | | |
|---|---|---|
| 3,668,307 | 6/1972 | Face et al. . |
| 3,798,605 | 3/1974 | Feistel . |
| 3,803,491 | 4/1974 | Osborn . |
| 3,886,302 | 5/1975 | Kosco . |
| 3,924,187 | 12/1975 | Dormans . |
| 4,156,907 | 5/1979 | Rawlings et al. . |
| 4,251,691 | 2/1981 | Kakihara et al. . |
| 4,329,675 | 5/1982 | Van Hulle . |

(List continued on next page.)

FOREIGN PATENT DOCUMENTS

| | | |
|---|---|---|
| 61-073452 | 4/1986 | Japan . |
| PCT/US81/ 00414 | 3/1981 | WIPO . |

OTHER PUBLICATIONS

19 Page Computer Search Report.
Frezza, William, *Videotex '84*—Apr. 1984, Online Inc. "The Broadband Solution —Metropolitan CATV Networks".
Elllis, M.L., et al., *IEEE Journal on Selected Areas In Communications*, vol. SAC–1, No. 2, Feb, 1983, "INDAX: An Operational Interactive Cabletext System".
Toms, Norman, *IEEE Transactions on Communications*, vol. COM–26, No. 7, Jul, 1978, "An Integrated Network Using Fiber Optics (INFO) for the Distribution of Video, Data and Telephony in Rural Areas".
Rose, Kenneth, *IEEE Transactions on Communications*, vol. COM–23, No. 1, Jan, 1975, "Design of a Switched Broad–Band Communications Network for Interactive Services".

*Primary Examiner*—Nathan Flynn
*Attorney, Agent, or Firm*—Akin, Gump, Strauss, Hauer & Feld, L.L.P.

[57] ABSTRACT

An access system and method for providing interactive access to an information source through a television distribution system is disclosed. The distribution system includes a television distribution network, headend distribution equipment at the headend of the distribution network, and a plurality of terminals at terminal ends of the distribution network. An input device and an upstream transmitter are associated with one of the terminals to input a command for the information source and to transmit the inputted command on an upstream channel of the distribution network, respectively. A headend server, upstream receiver, and blank interval inserter are associated with the headend distribution equipment. The headend server is interfaced to the information source. The upstream receiver is interfaced to the headend server to receive and forward the command to the headend server. The headend server transmits the forwarded command to the information source, and the information source transmits responsive information to the headend server. The blank interval inserter receives the information from the headend server and inserts sequential portions into blank intervals of sequential picture fields of a television transmission on a downstream channel of the distribution network. The blank interval extractor is interfaced to the terminal to extract the inserted sequential portions. The extracted information is then displayed on a display device associated with the terminal.

58 Claims, 10 Drawing Sheets

U.S. PATENT DOCUMENTS

| | | |
|---|---|---|
| 4,388,645 | 6/1983 | Cox et al. . |
| 4,396,989 | 8/1983 | Fleming et al. . |
| 4,404,589 | 9/1983 | Wright, Jr. . |
| 4,439,759 | 3/1984 | Fleming et al. . |
| 4,439,761 | 3/1984 | Fleming et al. . |
| 4,450,477 | 5/1984 | Lovett . |
| 4,454,593 | 6/1984 | Fleming et al. . |
| 4,461,032 | 7/1984 | Skerlos . |
| 4,475,123 | 10/1984 | Dumbauld et al. . |
| 4,484,218 | 11/1984 | Boland et al. . |
| 4,491,983 | 1/1985 | Pinnow et al. . |
| 4,509,073 | 4/1985 | Baran et al. ............................... 358/86 |
| 4,521,891 | 6/1985 | Biba et al. .................................. 375/8 |
| 4,545,075 | 10/1985 | Miller et al. . |
| 4,623,920 | 11/1986 | Dufresne et al. . |
| 4,625,235 | 11/1986 | Watson . |
| 4,638,356 | 1/1987 | Frezza . |
| 4,712,239 | 12/1987 | Frezza et al. . |
| 4,734,764 | 3/1988 | Pocock et al. . |
| 4,757,460 | 7/1988 | Bione et al. . |
| 4,792,948 | 12/1988 | Hagen et al. . |
| 4,862,268 | 8/1989 | Campbell et al. . |
| 4,928,177 | 5/1990 | Martinez . |
| 4,972,463 | 11/1990 | Danielson et al. . |
| 4,982,430 | 1/1991 | Frezza et al. . |
| 5,093,718 | 3/1992 | Hoarty et al. . |
| 5,124,980 | 6/1992 | Maki . |
| 5,142,532 | 8/1992 | Adams . |
| 5,220,420 | 6/1993 | Hoarty et al. . |
| 5,245,429 | 9/1993 | Virginio et al. . |
| 5,347,304 | 9/1994 | Moura et al. . |
| 5,359,367 | 10/1994 | Stockill . |
| 5,375,160 | 12/1994 | Guidon et al. . |
| 5,412,720 | 5/1995 | Hoarty . |
| 5,414,773 | 5/1995 | Handelman . |
| 5,418,559 | 5/1995 | Blahut . |
| 5,421,030 | 5/1995 | Baran . |
| 5,425,027 | 6/1995 | Baran . |
| 5,446,918 | 8/1995 | Lamy . |
| 5,481,542 | 1/1996 | Logston et al. ........................ 370/94.2 |
| 5,488,412 | 1/1996 | Majeti et al. . |
| 5,490,208 | 2/1996 | Remillard . |
| 5,499,241 | 3/1996 | Thompson et al. . |
| 5,526,034 | 6/1996 | Hoarty et al. . |
| 5,550,578 | 8/1996 | Hoarty et al. . |
| 5,566,306 | 10/1996 | Ishida ...................................... 395/309 |
| 5,581,555 | 12/1996 | Dubberly et al. ....................... 370/487 |
| 5,586,121 | 12/1996 | Moura et al. . |
| 5,589,872 | 12/1996 | Martinez . |
| 5,594,509 | 1/1997 | Florin et al. ............................ 348/731 |
| 5,594,726 | 1/1997 | Thompson et al. . |
| 5,606,725 | 2/1997 | Hart ......................................... 455/3.1 |
| 5,608,446 | 3/1997 | Carr et al. . |
| 5,612,730 | 3/1997 | Lewis . |
| 5,654,748 | 8/1997 | Matthews, III .......................... 348/13 |
| 5,659,350 | 8/1997 | Hendricks et al. ........................ 348/6 |
| 5,675,390 | 10/1997 | Schindler et al. ...................... 348/552 |
| 5,689,799 | 11/1997 | Dougherty et al. ........................ 455/2 |
| 5,761,602 | 6/1998 | Wagner et al. ........................... 455/3.1 |
| 5,768,539 | 6/1998 | Mertz et al. . |
| 5,818,441 | 10/1998 | Throckmorton et al. . |

DATA PAYLOAD 112

HOUSEKEEPING PAYLOAD 114

UPSTREAM PACKET 116

UPSTREAM PAYLOAD STRUCTURE 118

LOGIN REQUEST 120

UPSTREAM ACKNOWLEDGE 122

UPSTREAM RE-SEND REQUEST 124

UPSTREAM KEYSTROKE 126

UPSTREAM MOUSE MOVEMENT 128

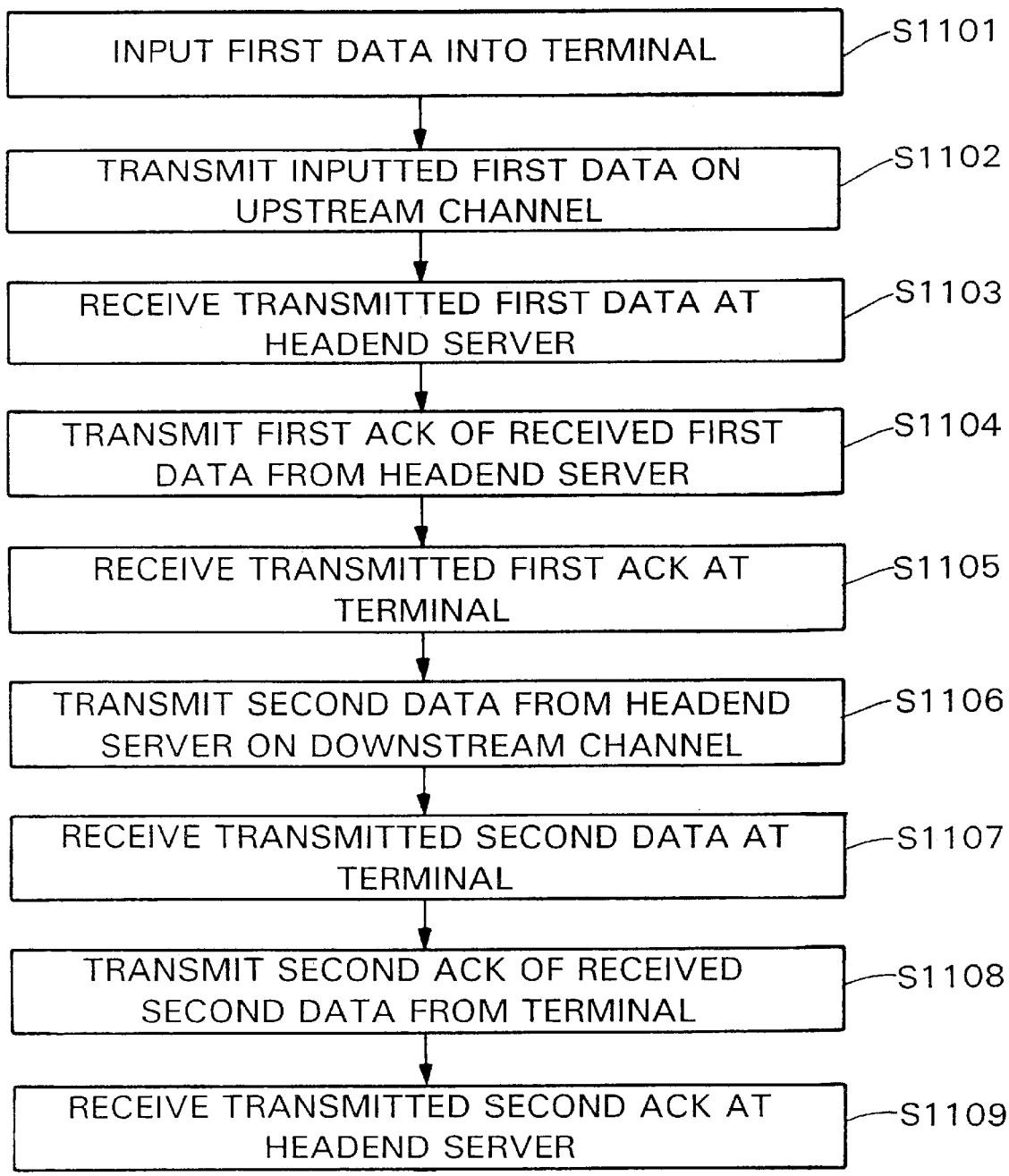

ACCESS SYSTEM AND METHOD FOR PROVIDING INTERACTIVE ACCESS TO AN INFORMATION SOURCE THROUGH A TELEVISION DISTRIBUTION SYSTEM

FIELD OF THE INVENTION

The present invention relates generally to an access system and method for providing interactive access to an information source-without the need for expensive computer hardware. More particularly, the present invention relates to providing access to the Internet through a cable television distribution system.

BACKGROUND OF THE INVENTION

As is well-known, "internet" a world-wide interconnected network of computers, and access to the Internet may be had for purposes of communication, research, entertainment, and the like. However, and as is also well-known, such access normally requires the use of relatively expensive equipment including a personal computer and related hardware and software. Since a first significant percentage of the general population cannot afford such expensive equipment, such first population is prevented from accessing the Internet.

Further, using such a personal computer and related equipment requires a relatively high degree of technical sophistication and commitment. Accordingly, even if a user can afford to buy a system including a personal computer, a printer, a modem, cables, and other necessary related gear, the user must properly connect and configure each device, must learn how to operate each device, and must update hardware and software as necessary to maintain the system. Since a second significant percentage of the general population does not have the technical sophistication required for such a system, and since a third significant percentage of the general population either cannot or will not dedicate the time and resources necessary to learn, operate, and maintain such a system, such second and third populations are prevented from accessing the Internet. Accordingly, a need exists for an access system and method that is relatively inexpensive, that requires only a minimum of technical sophistication and commitment, and is relatively easy to use.

SUMMARY OF THE INVENTION

The aforementioned need is satisfied by an access system and method for providing an interactive access system to an information source through a television distribution system which includes a television distribution network, headend distribution equipment, and a plurality of terminals. The television distribution network has a network headend, a plurality of terminal ends, a plurality of upstream channels, and a plurality of downstream channels. Each downstream channel carries a television transmission which includes a plurality of sequentially transmitted picture fields, and each transmitted picture field including a picture interval corresponding to a transmission of pixelated picture data and a blank interval corresponding to a transmission of no pixelated picture data. Each upstream channel carries data transmissions to the network headend.

The headend distribution equipment is interfaced to the network headend of the television distribution network for distributing the television transmissions over the respective downstream channels of the television distribution network. Each terminal is interfaced to a terminal end of the television distribution network for receiving the television transmissions over the respective downstream channels of the television distribution network, and is also interfaced to a display device for displaying a selected one of the television transmissions.

The access system includes an input device, an upstream transmitter, a headend server, an upstream receiver, a blank interval inserter, and a blank interval extractor. The input device is associated with one of the terminals for inputting into the terminal a command for the information source. The upstream transmitter is associated with the terminal and transmits the inputted command on an upstream channel of the distribution network. The headend server is associated with the headend distribution equipment and is interfaced to the information source. The upstream receiver is also associated with the headend distribution equipment and is interfaced to the headend server for receiving the inputted command on the upstream channel of the distribution network and for forwarding the received command to the headend server.

The headend server transmits a command based on the forwarded command to the information source, and the information source transmits information to the headend server in response to the forwarded command. The blank interval inserter is associated with the headend distribution equipment and is interfaced to the headend server to receive information based on the transmitted information from the headend server and to insert sequential portions of the received information into the blank intervals of sequential picture fields of at least one of the television transmissions. The blank interval extractor is interfaced to the terminal for extracting the inserted sequential portions of the information from the blank intervals of the sequential picture fields of the television transmissions. The extracted information is then displayed on the display device.

BRIEF DESCRIPTION OF THE DRAWINGS

The foregoing summary as well as the following detailed description of a preferred embodiment of the invention will be better understood when read in conjunction with the appended drawings. For the purpose of illustrating the invention, there is shown in the drawings an embodiment which is presently preferred. It should be understood, however, that the invention is not limited to the precise arrangements and instrumentalities shown. In the drawings:

FIG. 11 is a flow diagram showing the acknowledgement process performed in the preferred embodiment of the present invention.

DETAILED DESCRIPTION OF PREFERRED EMBODIMENT

Figure 1:
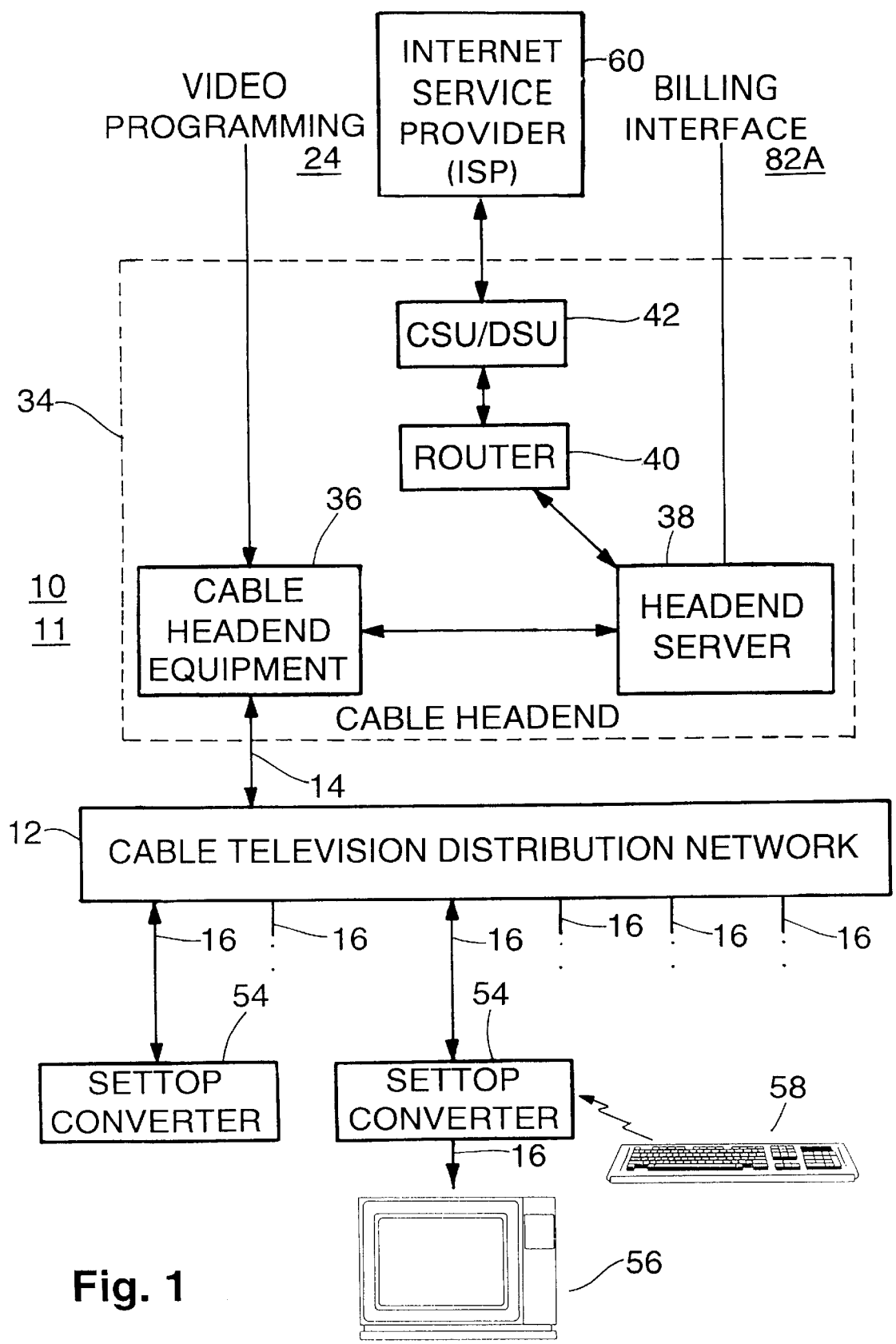
FIG. 1 is a block diagram of the architecture of an access system and a television distribution system in accordance with a preferred embodiment of the present invention.

Referring to the drawings in detail, wherein like are used to indicate like elements throughout, there is shown in FIG. 1 a preferred embodiment of an access system 10 for providing interactive access to an information source through a television distribution system 11. As seen, the components of the access system 10 and of the television distribution system 11 are by necessity commingled. Preferably, the television distribution system 11 is a cable television distribution system 11 comprising a nodal television distribution network 12 of branched fiber-optic and/or coaxial cable lines. As one skilled in the art will appreciate, such a television distribution system 11 and network 12 are well-known and are used extensively by cable television service providers throughout the United States. However, one skilled in the art will also recognize that other types of television distribution systems 11 and networks 12 may be employed without departing from the spirit and scope of the present invention. Such other types of television distribution systems and networks include but are not limited to orbiting satellite systems, terrestrial wireless cable systems, and the like.

As seen in FIG. 1, the television distribution network 12 has a network headend 14 and a plurality of terminal ends 16. As should be understood, and referring now to FIGS. 2A and 2B, the network 12 has a frequency spectrum which is divided into a plurality of RF-modulated downstream channels 20 (FIG. 2A) and a plurality of RF-modulated upstream channels 22 (FIG. 2B), where each downstream channel 20 carries a television transmission 24 from the network headend 14 to the terminal ends 16, and each upstream channel carries data transmissions 26 from the terminal ends 16 to the network headend 14.

Figure 2A:
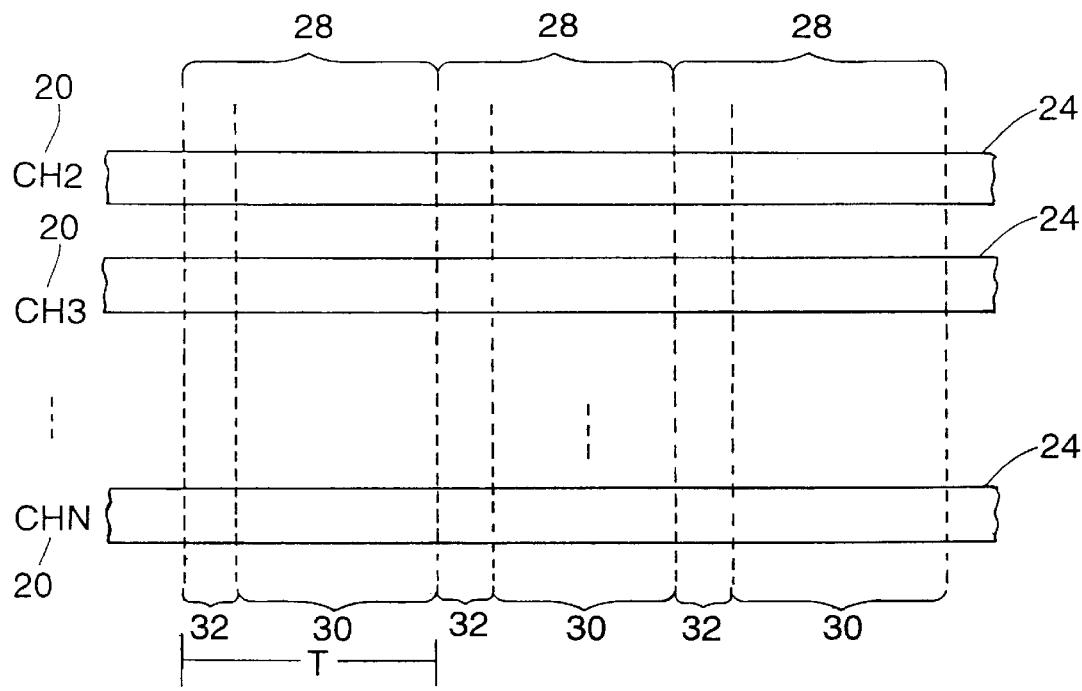
FIGS. 2A and 2B are timing diagrams of downstream and upstream channels, respectively, of the television distribution network shown in FIG. 1.
Figure 2B:
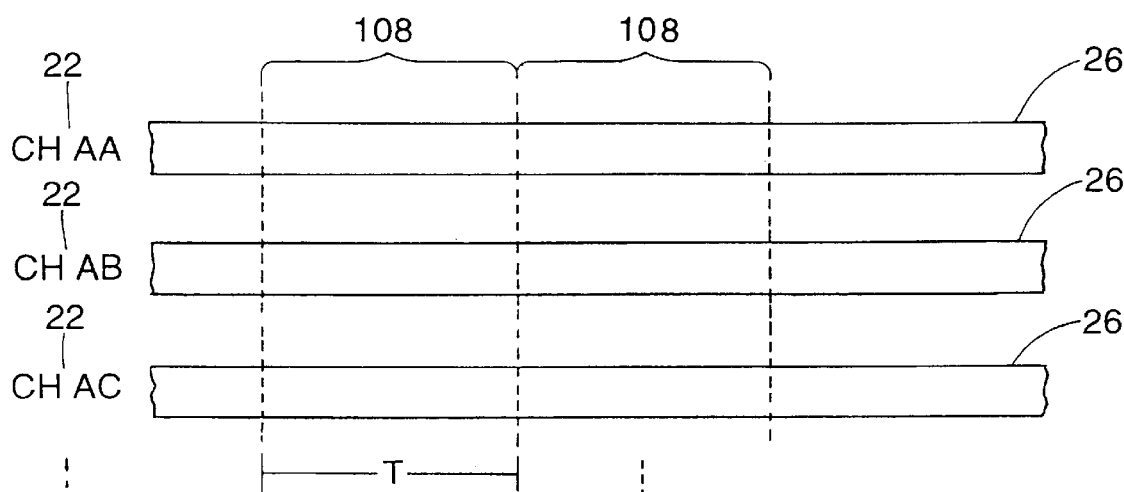

As seen in FIG. 2A, each television transmission 24 on a respective downstream channel 20 includes a plurality of sequentially transmitted picture fields 28, where each transmitted picture field 28 includes a picture interval 30 corresponding to a transmission of pixelated picture data, and a blank interval or vertical blanking interval 32 corresponding to a transmission of no pixelated picture data. As is known, the blank interval 32 is necessary due to constraints imposed by electron gun display devices. More particularly, many (but not all) television display devices employ an electron gun (not shown) and a phosphorescent screen (also not shown) to display a television transmission 24, and a picture from a transmitted picture field 28 is created on the screen by focusing the electron gun to fire electrons onto the screen in a series of horizontal lines sequentially applied from the top of the screen to the bottom. Accordingly, after the end of a first picture field 28, a vertical blanking interval 32 is necessary at the beginning of a second picture field 28 to allow time to retrace the electron gun from the bottom of the screen to the top. As is known, each transmitted picture field 28 also includes a horizontal blanking interval (not shown) between each transmitted horizontal line to allow time to retrace the electron gun from the end of one line to the beginning of another line. As is also known, each picture field 28 in the USA broadcasting convention is $\frac{1}{60}$th of a second in temporal length T, and two picture fields 28 combine to form one picture frame.

Figure 4:
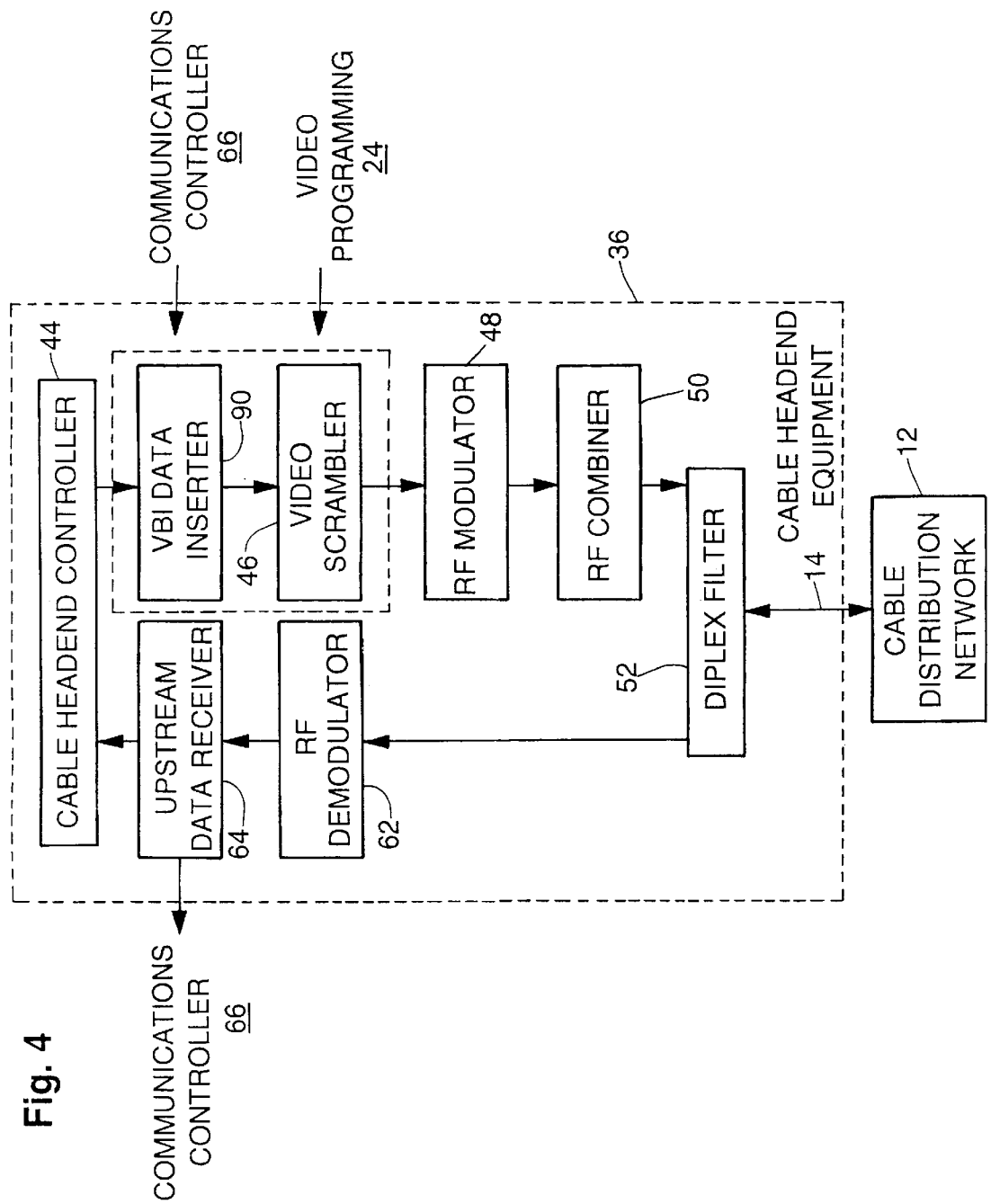
FIG. 4 is a block diagram of the cable headend equipment shown in FIG. 1.

As seen in FIG. 1, the network headend 14 of the television distribution system 11 is connected to a cable headend 34, and the cable headend 34 includes cable headend equipment or headend distribution equipment 36 and a headend server 38. Referring now to FIG. 4, it is seen that the cable headend equipment 36 includes a cable network headend controller 44 for controlling the distribution of the television transmissions 24 over the respective downstream channels 20 of the television distribution network 12. The headend controller 44 is well-known and therefore need not be further described here.

For each downstream channel 24, the cable headend equipment 36 may also include a video scrambler 46 for receiving the television transmissions 24 in the form of video programming and scrambling such video programming 24 (only one video scrambler 46 is shown in FIG. 4). As should be understood by one skilled in the art, not all television distribution systems 11 scramble, and scrambling is not a requirement in the preferred embodiment of the present invention. An RF modulator 48 is included in the cable headend equipment for each downstream channel 20 to modulate the respective television transmission 24 to the downstream channel 20 frequency (only one RF modulator 48 is shown in FIG. 4), and a single RF combiner 50 receives the outputs from all RF modulators 48 and combines such outputs to form a single signal. The single signal output from the RF combiner 50 is fed to a diplex filter 52 and then to the network headend 14. As should be understood, the diplex filter 52 also receives the upstream data transmissions 26 on the upstream channels 22 and separates out such upstream data transmissions 26 to be sent further upstream.

Referring again to FIG. 1, it is seen that the television distribution system 11 also has a plurality of set top converters or terminals 54, each terminal 54 being interfaced to a terminal end 16 of the television distribution network 12 for receiving the television transmissions 24 over the respective downstream channels 20 of the television distribution network 12. As should be understood, each terminal 54 is for selecting one of the downstream channels 20 and is for being interfaced to a display device 56 for displaying the television transmission 24 carried on the selected downstream channel 20. Typically, the display device 56 is a tunable television set, although one skilled in the art will recognize that a non-tunable television monitor may also be employed without departing from the spirit and scope of the present invention.

Figure 6:
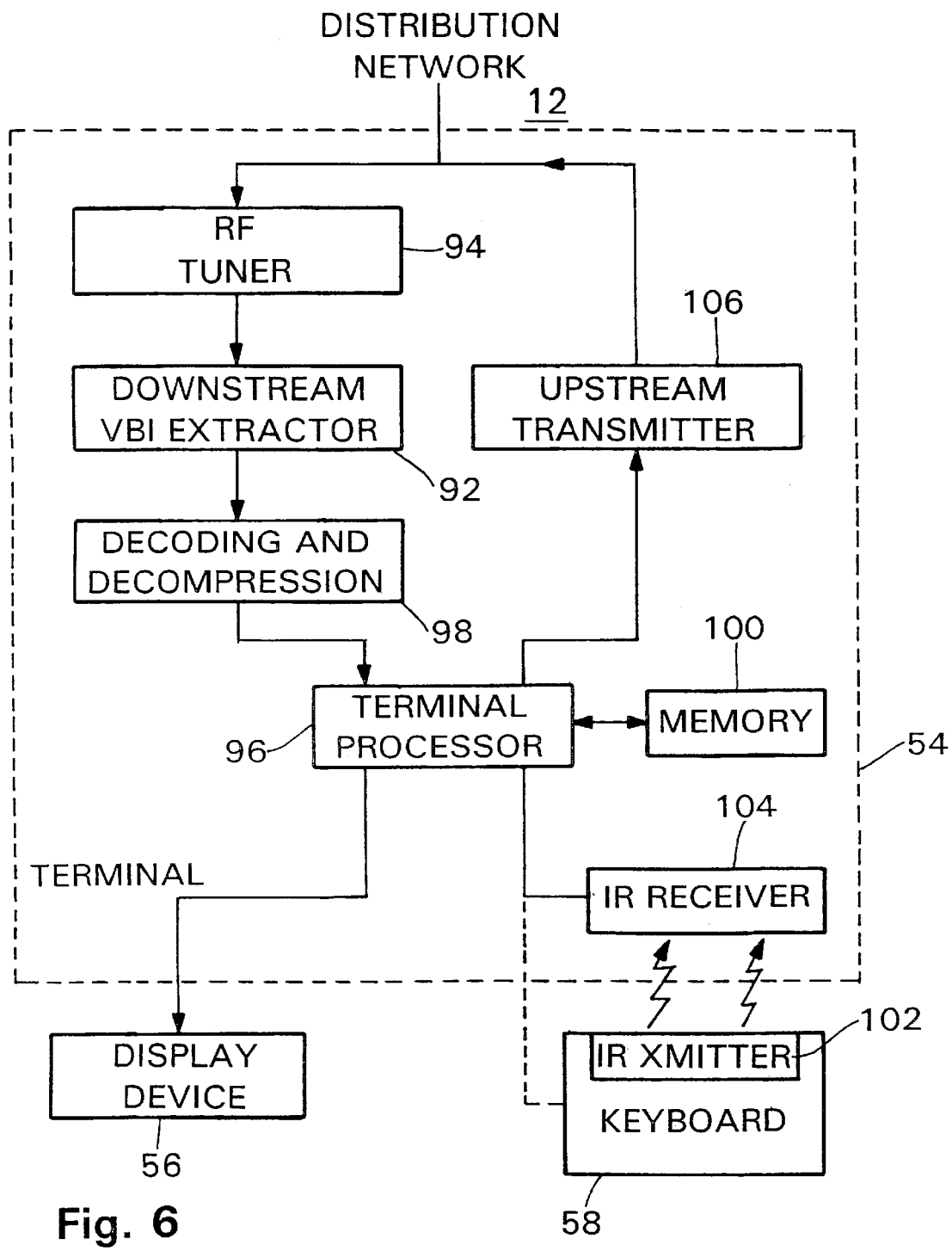
FIG. 6 is a block diagram of the application server s own in FIG. 3.

With the television distribution system 11 as thus far described, the access system 10 will now be discussed. Still referring to FIG. 1, it will be seen that the access system 10 includes an input device 58 associated with one of the terminals 54 for inputting into the terminal a command for an information source 60. As seen in FIG. 6, the command input into the terminal 54 by the inputting device 58 is transmitted by an upstream transmitter 106 on an RF-modulated upstream channel 22 of the television distribution network 12 from the terminal 54 to the cable headend equipment 36.

Preferably, the information source 60 is an Internet service provider having access to the well-known Internet intercommunications network. However, one skilled in the art will recognize that other information sources may be accessed without departing from the spirit and scope of the present invention. For example, the information source 60 may be a local information source at the cable headend 34, an E-mail interchange, a "chat room" interchange, the application server 68 itself, or the like.

Figure 3:
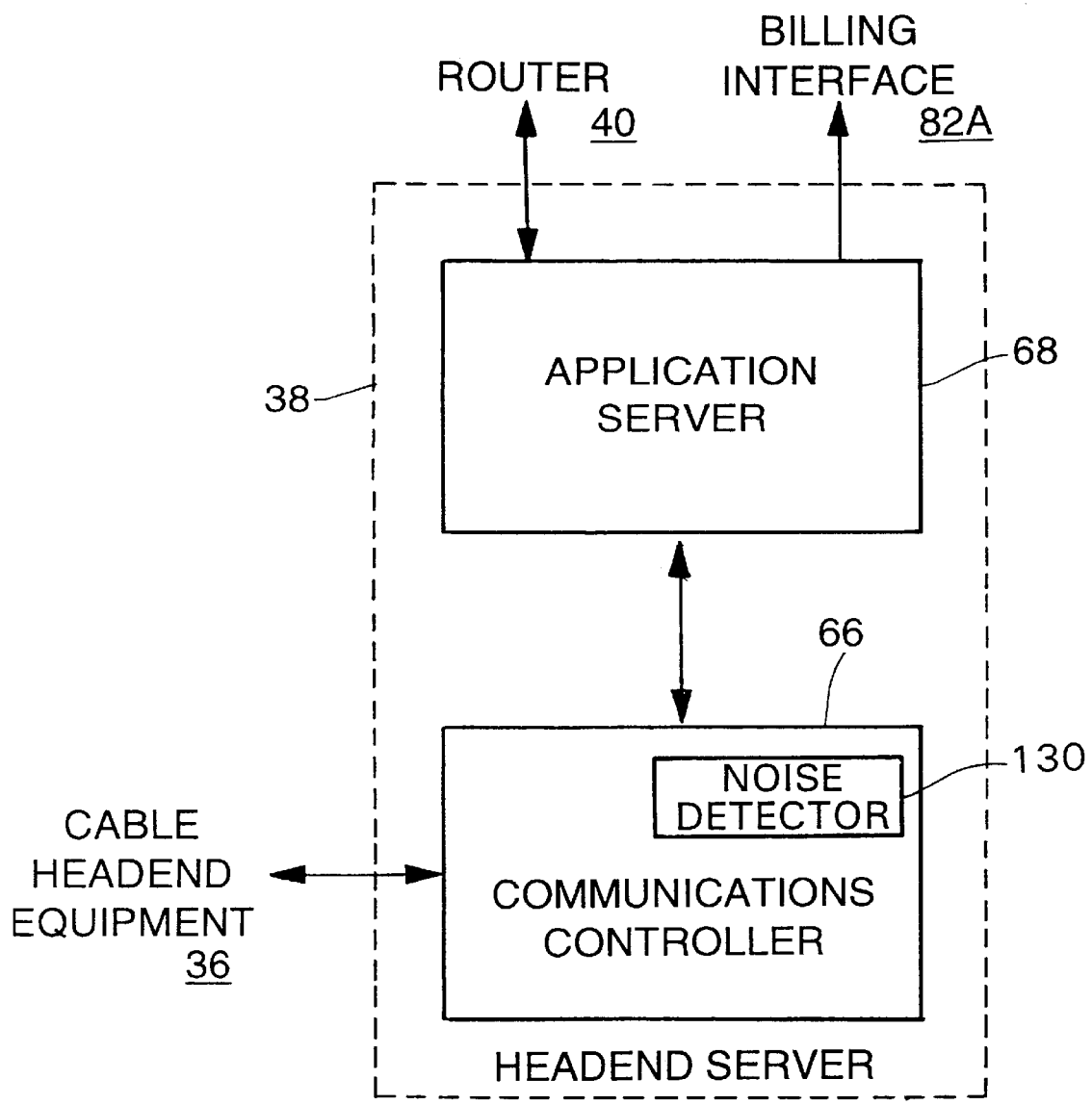
FIG. 3 is a block diagram of the headend server shown in FIG. 1.

Referring again to FIG. 4, all upstream channels are received from the network headend 14 of the cable distribution network 12 at the diplex filter 52, are separated by the diplex filter 52 from the downstream channels 20, and are forwarded to RF demodulators 62, one RF demodulator 62 for each upstream channel 22 (only one RF demodulator 62 is shown in FIG. 4). Accordingly, the RF-modulated upstream channel 22 having the transmitted command is demodulated, and the command is forwarded to an upstream data-receiver 64 which in turn forwards the received command to the headend server 38 (as seen in FIGS. 1 and 3).

As seen, the headend server 38 is associated with the cable headend equipment 36 and is interfaced to the information source 60. Accordingly, the headend server 38 transmits a command based on the forwarded command from the upstream receiver 64 to the information source 60 by way of the router 40 and the CSU/DSU 42. More specifically, and referring now to FIG. 3, the headend server 38 is preferably partitioned into a communications controller 66 and an application server 68, and the command from the upstream receiver 64 is received by the communications controller 66 and is then forwarded to the application server 68. As will be discussed more fully below, the communications controller 66 packetizes downstream data, de-packetizes upstream data, handles session requests from terminals 54, and otherwise performs functions necessary to maintain communications between the application server 68 and the terminals 54.

Figure 5:
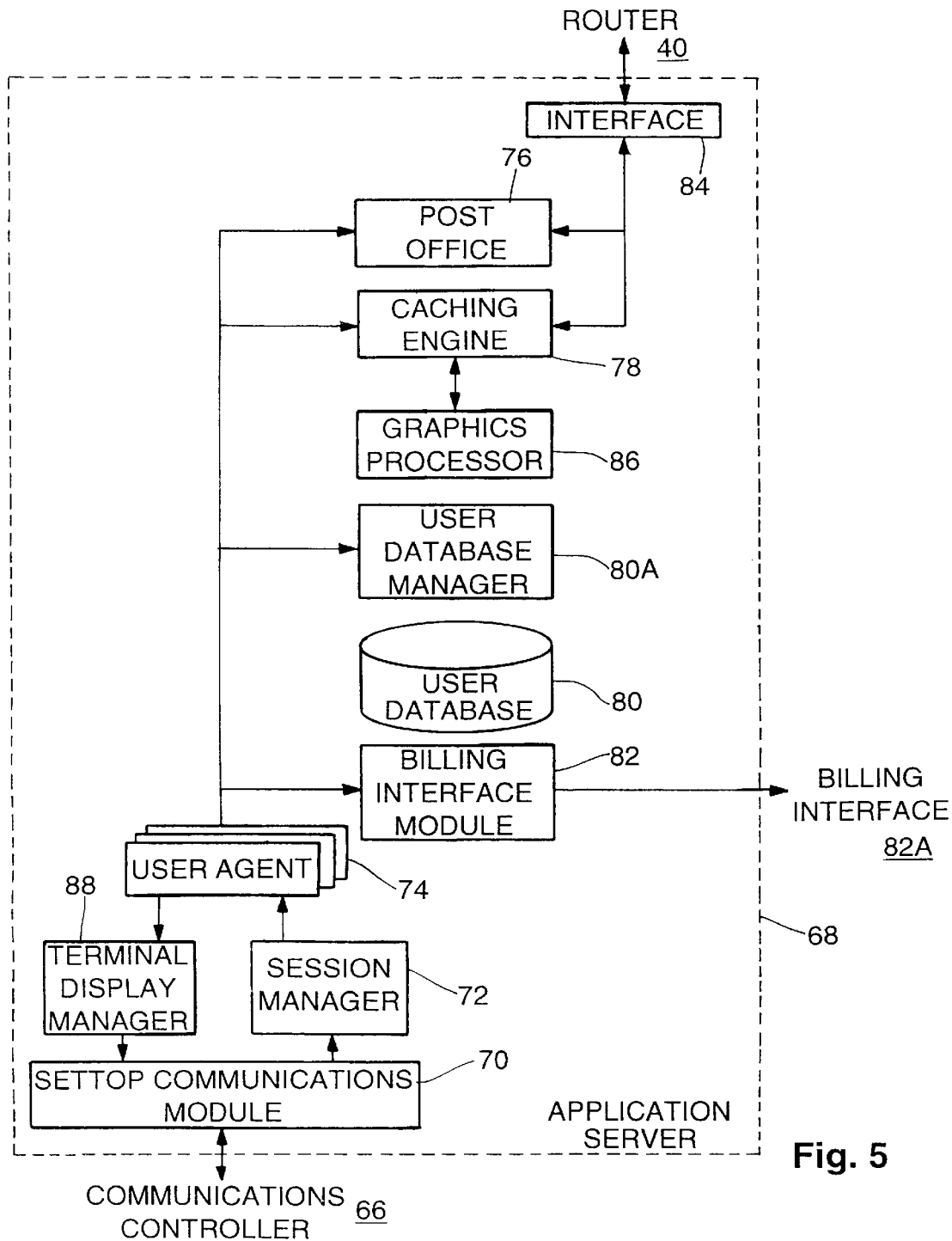
FIG. 5 is a block diagram of the application server shown in FIG. 3.

Referring now to FIG. 5, it is seen that the application server 68 includes a set top communications module 70 in communication with the communications controller 66 for interfacing the application server 68 to the communications controller 66, and the received command from the communications controller 66 is forwarded to the set top communications module 70 and then in turn forwarded to a session manager 72. As should be understood, the session manager 72 manages multiple sessions from multiple set top terminals 54, and therefore maintains an association between the received command and the terminal 54 that originated the received command. Depending on the command and the current application, the received command is forwarded by the session manager 72 to one of several user agents 74. As should be understood, the user agents 74 include a browser for browsing through the information source 60, an E-mail agent for facilitating E-mail through the information sources 60, a chat agent for facilitating on-line chat sessions, and the like. User agents are well-known and therefore need not be described here in more detail.

In response to a received command, a user agent 74 issues one or more further commands based on the received command in a format understandable by the information source 60, and the issued commands are forwarded to the information source 60 by way of a post office 76, a caching engine 78, or by bypassing the post office 76 and the caching engine 78. As should be understood, the post office 76 facilitates the sending and receiving of E-mail, and the caching engine 78 stores and forwards traffic in either direction. In addition, the caching engine 78 may keep track of issued commands and store certain data if requested on a regular basis. As should also be understood, the post office 76 and the caching engine 78 may be bypassed when not needed, e.g. during an on-line chat session. As with user agents, post offices and caching engines are well-known and therefore need not be described here in more detail.

Preferably, the application server 68 also has a user database manager 80A in combination with a user database 80 for managing access system user information. As should be understood, such information includes information on each user, certain characteristics and attributes associated with each user, information on frequently accessed information for each user, and the like. The application server 68 may also have a billing interface module 82 associated with a billing interface 82A for purposes of billing users for use of the access system 10. As one skilled in the art will recognize, the billing interface 82A can connect with any of a plurality of known accounting systems for purposes of billing, including the accounting system for billing use of the television distribution system 11.

Preferably, the application server 68 includes an information source interface 84 for allowing the application server 68 to communicate with the information source 60 by way of whatever protocol the information source 60 may be expecting. For example, if the information source 60 is an Internet service provider, the protocol would preferably be the TCP/IP (transmission control protocol/Internet protocol) protocol normally used to communicate on the Internet. However, depending on the information sources 60, one skilled in the art will recognize that other protocols may be employed without departing from the spirit and scope of the present invention.

Preferably, and referring again to FIG. 1, the interface 84 in FIG. 5 communicates with the information source 60 by way of a router 40 and a consumer service unit/digital service unit (CSU/DSU) 42 associated with the cable headend 34. As should be understood, the router 40 is connected to the interface 84 for routing/pipelining data between the information source 60 and the interface 84, and the CSU/DSU 42 (also seen in FIG. 1) is a service unit for interfacing the router 40 to the information source 60. Both routers and CSU/DSUs are well-known and therefore further description is not necessary. Moreover, one skilled in the art will recognize that other methods of interfacing the information source 60 to the headend server 38 may be employed without departing from the spirit and scope of the present invention. Further, one skilled in the art will also recognize that not all commands need be forwarded to the information source 60. For example, if requested information is already available in the application server 68 at the caching engine 78 (a highly requested Internet home page, for example), the information source 60 need not be communicated with to procure the requested information. Likewise, if the command is a message from a first terminal 54 to a second terminal 54 by way of the headend server 38 (as discussed below), no communication need be had with the information source 60.

Once the information source 60 has received a command, the information source 60 preferably processes the command to produce information in response thereto. The produced information is transmitted by the information source 60 to the headend server 38, and must then be sent to the terminal 54 from which the corresponding command originated. Accordingly, and as seen in FIG. 5, the information from the information source is received in the application server 68 by way of the interface 84 and is forwarded through the post office 76 and/or the caching engine 78 to the appropriate user agent 74.

As should be recognized, depending upon the information source 60, the information from the information source 60 may not be in a form that is compatible for display on the display device 56 associated with the terminal 54. More particularly, in the situation where the information source 60 is an Internet service provider, the information will likely include graphics in a first graphic form (e.g. a screen having 640 pixels×480 pixels×256 colors) while the terminal 54 and display device 56 are likely expecting the information to be in a second graphics form (e.g. 320 pixels×200 pixels×16 colors). Accordingly, the graphics portion of the information must be converted by a graphics processor 86 in communication with the caching engine 78. The operation of a graphics processor in converting graphic data from one form to another is well-known and need not be further described here.

The information from the information source 60 is forwarded by the user agent 74 to a terminal display manager 88. Preferably, the terminal display manager 88 is designed to minimize the actual amount of information that must be transmitted to the terminal 54. Accordingly, it is preferable that the terminal display manager 88 render screens at the application server 68 for display at the appropriate terminal 54, that the terminal display manager 88 retain information on the screen currently being displayed at the appropriate terminal 54, and that the terminal display manager 88 transmit only the information necessary to refresh portions of a screen that are to be changed. The process of rendering screens for display by a screen renderer or the like is well-known and need not be further described here.

As should be understood, transmitting only refresh information can greatly reduce the amount of downstream information that must be sent to the terminal 54, especially if only a small change to a screen is necessary. Preferably, the terminal 54 is programmed to operate based on such refresh information.

The refresh information from the terminal display manager 88 and other information from the application server 68 is forwarded to the communications controller 66 by way of the set top communication module 70. Referring again to FIG. 4, the communications controller 66 receives the forwarded information and in turn forward such information to a vertical blanking interval (VBI) data inserter or VBI inserter 90. As should be understood, a VBI inserter 90 is provided for each downstream channel 20 (only one VBI inserter 90 is shown in FIG. 4) to insert sequential portions of the forwarded information from the communications controller 66 into the blank intervals 32 of sequential picture fields 28 of the television transmission 24 of the respective downstream channel 20.

As seen, each VBI inserter 90 is interposed in a downstream flow between the cable headend controller 44 and a respective video scrambler 46. As should be understood, many manufacturers provide a VBI inserter 90 and a video scrambler 46 in a combined package. Once the information from the communications controller 66 is inserted into the blank intervals 32 of a television transmission 24, the inserted information then proceeds with the television transmission 24 through the video scrambler 46, the RF modulator 48, the RF combiner 50, the diplex filter 52, and the cable distribution network 12 to the terminal 54 from which the corresponding command originated. As one skilled in the art should appreciate, in some circumstances a horizontal blanking interval (HBI) data inserter (not shown) may be employed instead of the VBI inserter 90 without departing from the spirit and scope of the present invention.

Referring now to FIG. 6, it will be seen that the terminal 54 includes an RF tuner 94 and a downstream VBI extractor 92. More particularly, the RF tuner 94 is preset to tune in and demodulate the downstream channel 20 having the television transmission 24 with the inserted information, and the VBI extractor 92 extracts the inserted sequential portions of the inserted information from the blank intervals 32 of the sequential picture fields 28 of the demodulated television transmission 24. The extracted information is then forwarded to a terminal processor 96.

As one skilled in the art will recognize, a significant advantage is obtained from employing VBI insertion and extraction to send downstream data from the headend server 38 to the terminal 54 in that the equivalent baud rate of such down stream data can approach 100K or more. More particularly, assuming the equivalent baud rate of each blank line in a VBI is about 12.5K, and assuming eight lines of each VBI are employed by the access system 10 of the preferred embodiment of the present invention, the 100K equivalent baud rate is achieved.

Preferably, the inserted information sent downstream from the cable headend equipment 36 is coded and/or compressed by the terminal display manager 88 using well-known techniques to minimize transmission time. Preferably, the processor 96 includes software for performing the function of decoding and decompressing the coded and/or compressed refresh information. Alternatively, the terminal 54 may include a decoding and/or decompression module 98 interposed between the VBI extractor 92 and the processor 96 for decoding and decompressing the coded and/or compressed refresh information before such information is presented to the terminal processor 96. As seen in FIG. 6, the terminal processor 96 may be associated with a memory 100 to facilitate the various processing functions performed thereby.

Preferably, the terminal processor 96 and the memory 100 produce display information from the extracted information, and the display information is displayed on the display device 56. Preferably, the extracted information includes the screens rendered by the terminal display manager 88 of the application server 68. The process of producing display information by a set top terminal 54 and terminal processor 96 is well-known and need not be further described here.

Preferably, and as seen in FIGS. 1 and 6, the input device 58 for inputting the commands into the terminal 54 is a computer-style keyboard 58. Accordingly, a user of the access system 10 can type word commands, E-mail, and the like. Also preferably, the keyboard 58 includes a mouse device for moving a graphic pointer displayed on the display device 56.

Preferably, the keyboard 58 includes an infrared (IR) transmitter 102 for transmitting keystroke signals from the keyboard 58 in the form of an IR transmission. Correspondingly, it is also preferable that the terminal 54 include an IR receiver 104 for receiving the IR transmissions from the keyboard 58 and for forwarding signals corresponding to the transmitted keystroke signals to the terminal processor 96.

However, the keyboard 58 may be tethered to the terminal 54 without departing from the spirit and scope of the present invention. Additionally, the keyboard 58 may be replaced with a remote control device having directional buttons and an execute button without departing from the spirit and scope of the present invention. As should be understood, such a remote control device is of the type typically employed with a terminal 54 in a television distribution system 11 for inputting into the terminal 54 a selection of one of a plurality of downstream channels 20 for display on the display device 56. Regardless of the source of the command, the terminal 54 transmits the command by way of the upstream transmitter 106 as a data transmission 26 on one of the upstream channels 22 of the television distribution network 12.

In the access system 10 of the preferred embodiment of the present system, the headend server 39 is a centralized processor for each of the plurality of the terminals 54.

Accordingly, the upstream receiver 64 may receive a plurality of inputted commands from a plurality of the terminals 54 on one or more of the upstream channels 22 of the distribution network 12, and then forward the respective received commands to the headend server 38. As should now be understood, the headend server 38 transmits commands based on the respective forwarded commands to the information source 60, the information source 60 transmits the information to the headend server 38 in response to the respective forwarded commands, the VBI inserter 90 receives information based on the respective transmitted information from the headend server 38 and inserts sequential portions of the received information into the blank intervals 32 of sequential picture fields 28 of at least one of the television transmissions 24, and each of the blank interval extractors 92 in the respective terminals 54 extracts the respective inserted sequential portions of the information.

Preferably, the headend server 39 acting as a centralized processor for each of the plurality of the terminals 54 allows for terminal-to-terminal communications, at least among the terminals 54 in the television distribution system 11. As should be understood, in such communication, a message is sent from a first terminal 54 to the headend server 38 and is then routed by the headend server 38 to a second terminal 54, bypassing the information source 60. Preferably, the message is an e-mail message or is a message transmitted during a chat session.

The transmission of upstream and downstream data between the terminal 54 and the communications controller 66 of the headend server 38 will now be described with reference to FIGS. 7–10F. Preferably, each upstream channel 22 of the television distribution network 12 is multiplexed into a plurality of upstream slots 108, as sees in FIG. 2B, where the temporal length T of each slot 108 is equal to the temporal length T of picture field 28, As seen in FIG. 2A. Also preferably, a plurality of the upstream channels 22 are paired with each downstream channel 20. In the preferred embodiment of the present invention, up to four upstream channels 22 are paired with each downstream channel 20. Also preferably, each terminal 54 on the system 10 is assigned to at least one of the upstream slots 108 at any one time.

Figure 7:
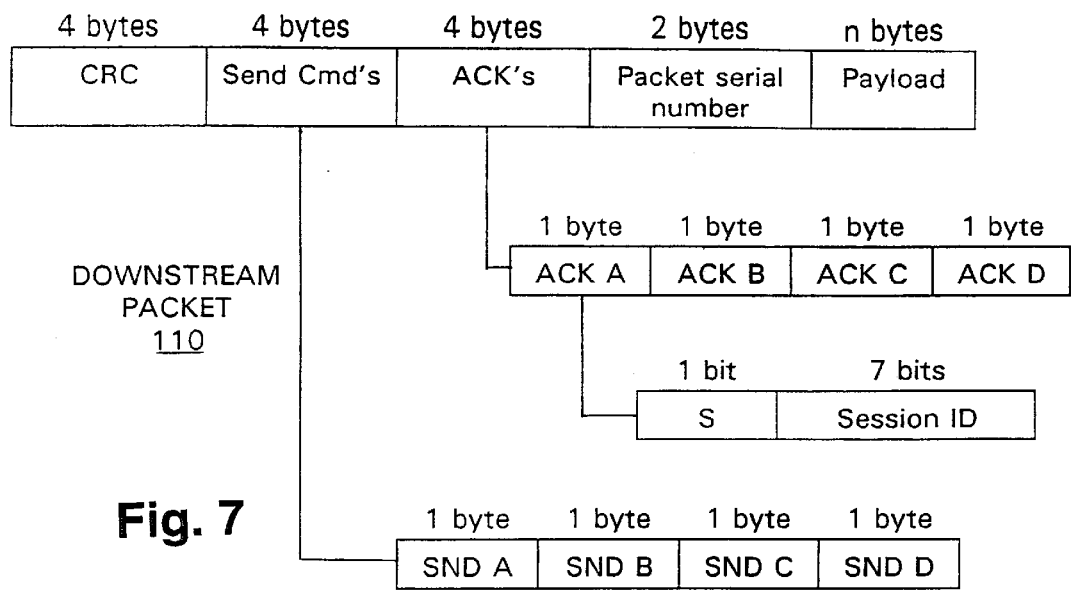
FIG. 7 is a diagram of a downstream packet transmitted on one of the downstream channels shown in FIG. 2A.

Preferably, and referring now to FIG. 7, each transmission of downstream data from the communications controller 66 of the headend server 38 is in the form of at least one downstream packet 110. As seen in FIG. 7, the downstream packet 110 includes a four-byte cyclical redundancy check (CRC) value based on the rest of the downstream packet 110, where the CRC value is employed to detect any corruption of the data in the packet 110. The use of CRC values is well-known and, therefore, need not be further described.

The downstream packet 110 also includes four SND bytes (SND A–SND D), where each SND byte corresponds to an upstream channel 22 associated with the downstream channel 20 on which the downstream packet 110 is being sent. Each SND byte contains a session ID of a sender (i.e., a terminal 54) that is allowed to transmit upstream data in the next upstream slot 108 of the corresponding upstream channel 22. For example, if the SND B byte has a value of '1', then the terminal 54 assigned the session ID '1' may transmit in the next upstream slot 10B on the upstream channel 22 that corresponds to 'B'. Preferably, if a particular SND byte has a value of zero, any terminal 54 is allowed to transmit in the next corresponding upstream slot 108, for example, to request a new session.

Each downstream packet 110 also has four acknowledgment (ACK A–ACK D) bytes, where each ACK byte corresponds to an upstream channel 22 associated with the downstream channel 20 on which the downstream packet 110 is being sent. As should be understood, each ACK byte is sent in response to the successful receipt of upstream data on a respective upstream channel 22 in the previous upstream slot 108. Preferably, each ACK byte includes the session ID of the transmitting terminal 54 and a check bit indicating whether the serial number of the upstream packet being acknowledged was an even or an odd number.

Figure 8A:
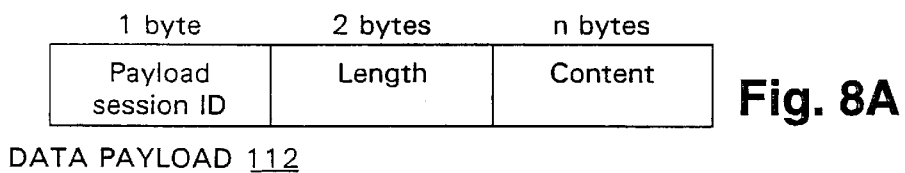
FIGS. 8A–8B are diagrams of payloads that can be sent in the downstream packet shown in FIG. 7.

The downstream packet 110 also has a two-byte packet serial number, followed by a multi-byte payload. Referring now to FIG. 8A, it is seen that a downstream data payload 112 includes a one-byte payload session ID for identifying the session ID of the intended receiving terminal 54 for the payload, a two-byte length indicator, and the contents of the data being sent in the packet. As should be understood, although all terminals 54 on the downstream channel 20 will receive all downstream packets 110, a particular terminal 54 will ignore the contents of the data being sent in the packet 110 unless the data payload 112 has a payload session ID corresponding to the session ID of the terminal 54.

Figure 8B:
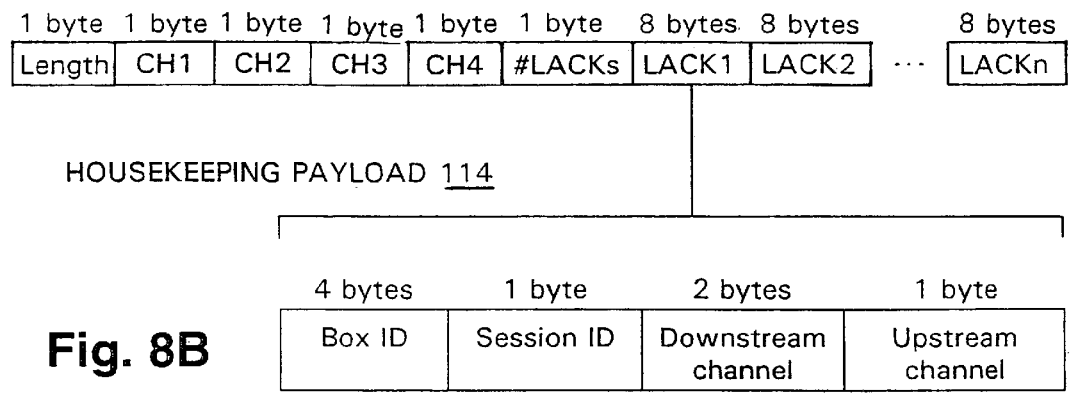

Preferably, a downstream packet 110 periodically has a housekeeping payload 114 rather than a data payload 112, as seen in FIG. 8B. As seen, the housekeeping payload 114 includes four channel bytes, each channel byte identifying a respective one of the four upstream channels 22 associated with the downstream channel 20 on which the downstream packet 110 is being sent. Accordingly, if a terminal 54 wishes to initiate a session on the access system 10, the terminal 54 must listen on the downstream channel 20 for a housekeeping packet 114, and upon receipt of such housekeeping packet can determine what upstream channels 22 are associated with the downstream channel 20. The terminal 54 can then send a session request on one of the associated upstream channels 22.

If session requests were recently made and acted upon by the communications controller 66, the housekeeping payload 114 also includes a number of session request (log-in) acknowledgements (LACKs). In particular, the housekeeping payload 114 includes a one-byte indicator of the number of LACKs, followed by each LACK. As seen, each LACK includes a 'box ID' corresponding to a unique terminal ID number associated with a requesting terminal 54, a one-byte session ID that identifies the requesting terminal 54 during the session, a two-byte downstream channel indicator indicating the downstream channel 20 the requesting terminal 54 should tune in to, and a one-byte upstream channel indicator indicating the upstream channel 22 the terminal 54 should be-broadcasting on.

Figure 9:
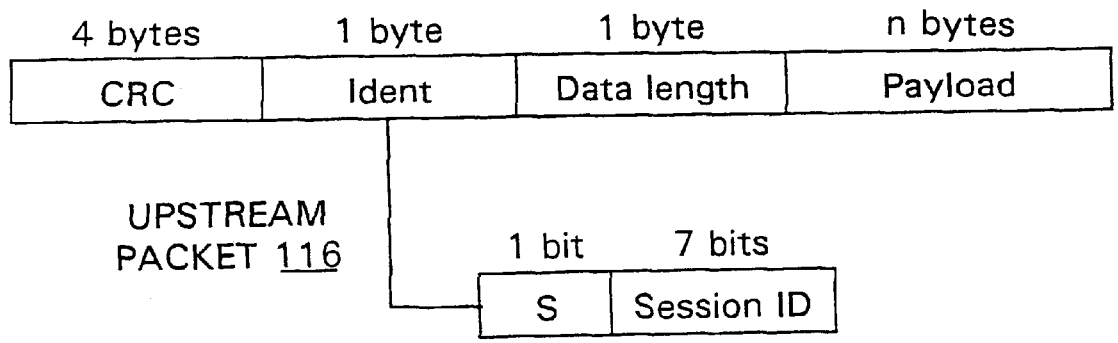
FIG. 9 is a diagram of an upstream packet transmitted on one of the upstream channels shown in FIG. 2B.
Figure 10A:
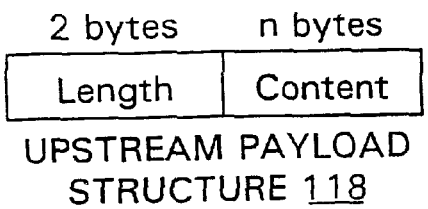
FIGS. 10A–10F are diagrams of payloads that can be sent in the upstream packet shown in FIG. 9.

Referring now to FIG. 9, upstream data from the terminal 54 is sent in the form of an upstream packet 116. As seen, each upstream packet 116 includes a 4-byte CRC value, as with each downstream packet 110, a one-byte identifier which has the session ID assigned to the terminal 54 and a check bit indicating whether the upstream packet 110 has an even or an odd packet number, a one-byte data length indicator indicating the length of a multi-byte upstream payload in the packet 116, and the payload. As seen in FIG. 10A, the upstream payload has a structure 118 that includes a two-byte length indicator and the contents of the payload. FIGS. 10B–10F are examples of the contents of various upstream payloads.

Figure 10B:
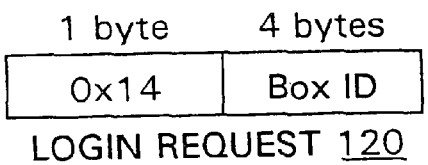
Figure 10C:
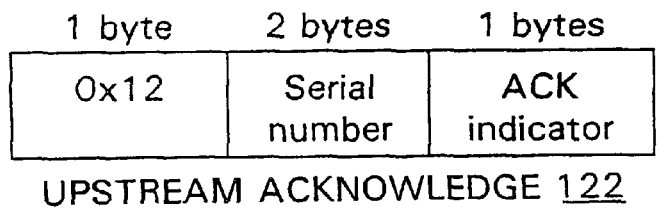

As seen in FIG. 10B, a session or log-in request 120 from terminal 54 includes a one-byte indicator signifying that the upstream packet 116 is a log-in request 120 and the unique box ID of the requesting terminal 54. As seen in FIG. 10C, an upstream acknowledge payload 122 includes a one-byte indicator signifying that the upstream packet 116 is an upstream acknowledge 122, a two-byte serial number of the downstream packet 110 that is being acknowledged, and a one-byte acknowledge (ACK) indicator.

Figure 10D:
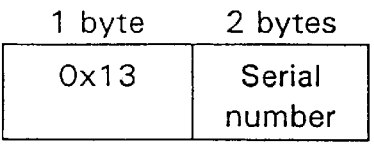

On occasion, an expected downstream data packet 110 is not received, or else is received with a corruption or error. Accordingly, and as seen in FIG. 10D, an upstream packet 116 may have an upstream re-send request payload 124 which includes a one-byte indicator signifying that the upstream packet 116 is an resend request 124, and a two-byte serial number of the downstream packet 110 that must be re-sent.

Figure 10E:
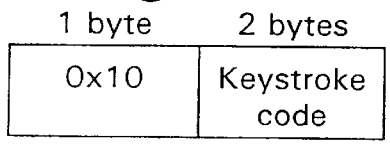

If the data being sent upstream by the terminal 54 is a keystroke from a computer-style keyboard 58 or other input device 58, then the upstream packet 116 has an upstream keystroke payload 126, as seen in FIG. 10E, which includes a one-byte indicator signifying that the upstream packet 116 is a keystroke payload 126, and a two-byte keystroke code. As should be understood, if the keystroke is from a keyboard 58, the keystroke code includes information on whether a CTRL/ALT/SHIFT key is being pressed at the time a key is struck.

Figure 10F:
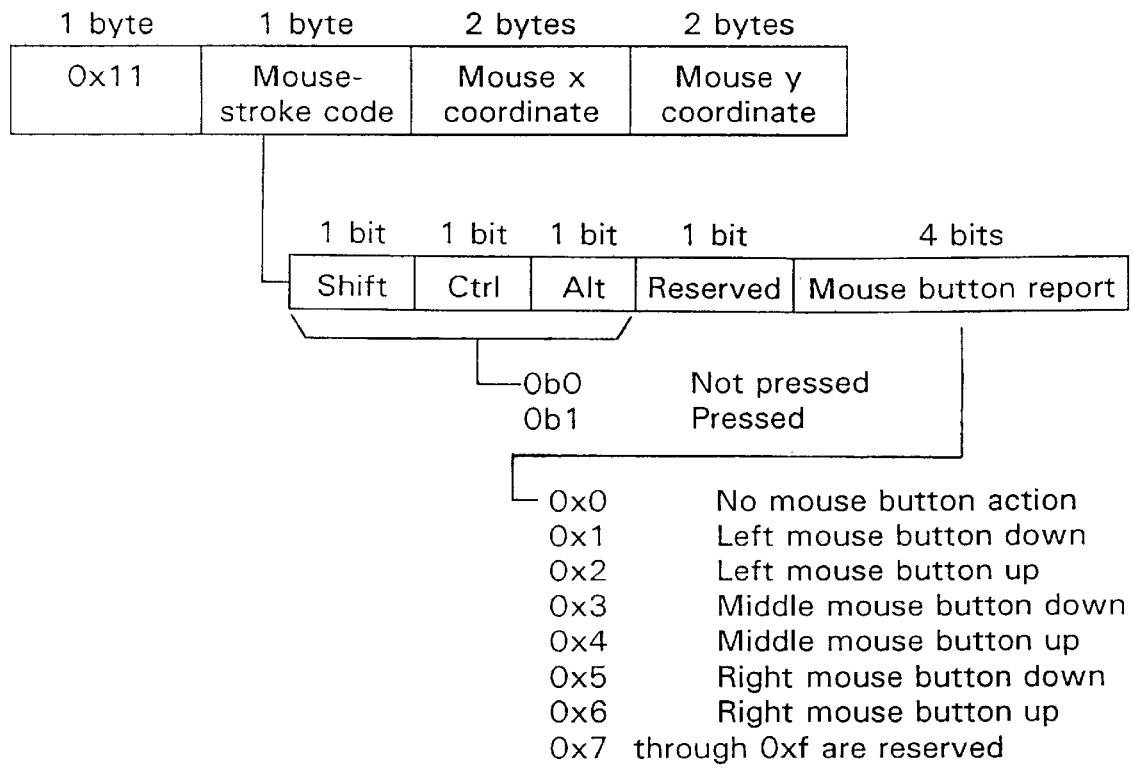

Preferably, the input device 58 includes a mouse or mouse-like device (not shown), and mouse movements are input to the terminal 54 and the access system 10 as commands. Accordingly, an upstream packet 116 may have upstream mouse movement information 128, as seen in FIG. 10F. The mouse movement information 128 includes a one-byte indicator signifying that the upstream packet 116 is a mouse movement payload 128, a one-byte mouse-stroke code, a two-byte mouse X-coordinate, and a two-byte mouse Y-coordinate. As should be understood, the one-byte mouse-stroke code includes information on whether a SHIFT/CTRL/ALT key is being pressed, and left, middle, and right mouse button information.

As one skilled in the art will readily appreciate, the particular structures of the downstream and upstream packets 110, 116 may be changed without departing from the spirit and scope of the present invention. For example, if only three upstream channels 22 are assigned to a downstream channel 20, only three SND and three ACK bytes are necessary in the downstream packet 110 (FIG. 7). Similarly, fields in the packets 110, 116 may be added, deleted, or changed in terms of structure or size.

As should be understood, due to the structure of a typical television distribution network 12, noise on upstream channels 22 is problematic. As a result, it is known that upstream channels 22 can have error rates as high as 1:100000 to 1:100. Accordingly, it is preferable that upstream data packets 116 are kept relatively short to lessen the probability that any one packet will be corrupted by noise. It should be noted, however, that such short upstream packets 116 are not prohibitive in that most upstream commands are relatively short: a mouse movement, a keystroke, etc.

Preferably, the problem of noise is also addressed by the present invention by including a noise detector 130 in the communications controller 66 at the cable headend 34, as seen in FIG. 3. Preferably, the noise detector 130 detects a noise level on each of the upstream channels 22, and if necessary, the communications controller 66 can re-assign a terminal 54 from a first upstream channel 22 to a second upstream channel 22 based on the noise level of the first upstream channel 22 and the second upstream channel 22.

Alternatively, the communications controller 66 can direct the terminal 54 to transmit at a higher level on the upstream channel 22 if necessary based on the detected noise level of the upstream channel 22. Preferably, the noise detector 130 comprises software that determines noise levels by keeping statistics corresponding to the number of corrupted upstream packets 116 received on each upstream channel 22.

With the access system 10 as described above, a terminal 54 requests a session in the following manner. Preliminarily, the terminal 54 tunes into a downstream channel 20 on which downstream packets 110 are being sent, and listens for a housekeeping packet 114 (as seen in FIG. 8B) to determine which upstream channels 22 are associated with the downstream channel 20. A random one of the upstream channels 22 is selected, and a log-in request 120 (FIG. 10B) is sent in an upstream slot 108 that has not been preassigned by a respective SND byte (as seen in FIG. 7). If a log-in acknowledge (LACK) (FIG. 8B), is subsequently received within a pre-determined number of time periods T (corresponding to the length of a picture field 28 (FIG. 2A) and to the length of an upstream slot (FIG. 2B)), the session request is successful. If not, a new random downstream and upstream channel 20, 22 may be tried.

In the unlikely event that two terminals 54 send a session request in the same upstream slot 108, the communications controller 66 will receive collided data and neither terminal 54 will receive a LACK. Preferably, each terminal 54 then waits a random amount of time and attempts a second session request. The process is repeated until both session requests are handled by the communications controller 66.

Once logged in, and after the terminal 54 issues an upstream command, the terminal waits for a downstream packet 110 that has been addressed to the terminal 54 in response to the command. Preferably, each received downstream packet 110 is checked to determine if the packet serial number is correct. If the packet serial number is wrong, a re-send request 124 (FIG. 10D) is sent with the packet serial number of the last packet that was successfully received. Preferably, the headend server 38 interprets a re-send request 124 as a request to re-send the packet 110 having the re-send serial number and every packet 110 sent thereafter.

If a re-send request 124 is sent multiple times without result, or if a downstream packet 110 has not been received by the terminal 54 in a predetermined period of time, the terminal 54 can attempt a re-connect. Preferably, in a re-connect attempt, the terminal makes a session request 120 on a new downstream and upstream channel 20, 22.

As was discussed above, each downstream packet 110 and upstream packet 116 is quickly acknowledged (ACKed) by the packet recipient, as seen in FIGS. 7 and 10C. As should be understood, such quick ACKs are necessary to address the problem of noise (as was discussed above) and to provide real-time access to the information source 60. Preferably, a packet sender waits for up to two upstream slots 108 or picture fields 28 to receive an ACK from a packet recipient. If an ACK is not received in this time by a terminal 54, the terminal 54 preferably re-sends the upstream packet 116 for which acknowledgment is sought. If a terminal 54 is forced to re-send data a predetermined number of times, a re-connect attempt is preferably made on new downstream and upstream channels 20, 22.

It is preferable that the following method be employed to send commands and receive information in the access system 10 as described above. In the method, and referring now to FIG. 11, first data is input for the headend server 38 into one of the terminals 54 (step S1101), and is transmitted from the terminal 54 on an upstream channel 22 of the distribution network 12 (step S1102). The transmitted first data is then received on the upstream channel 22 of the distribution network 12 at communications controller 66 of the headend server 38 (step S1103), And a first acknowledgment (ACK) of the received first data is transmitted from the headend server 38 on a downstream channel 20 of the distribution network 12 (S1104). The transmitted first ACK is then received on the downstream channel 20 of the distribution network 12 at the terminal 54 (step S1105) to indicate that the inputted first data was successfully received. Preferably, the first ACK is received by the terminal 54 within about two picture fields 28 or upstream slots 108 (2T).

In the method shown in FIG. 11, second data is also transmitted from the communications controller 66 of the headend server 38 on a downstream channel 20 of the distribution network 12 (step S1106) and is received by the terminal 54 (S1107). In response, the terminal 54 transmits a second ACK of the received second data on an upstream channel 22 of the distribution network 12 (step S1108), and the transmitted second ACK is received by the headend server 38 (step S1109) to indicate that the second data was successfully received by the terminal 54.

As should be understood, and as was previously described, each transmitting step on a downstream channel 20 in the real-time acknowledgment method described above includes the step of inserting sequential portions of information (i.e. the second data or the first ACK) into the blank intervals 32 of sequential picture fields 28 of at least one of the television transmissions 24 and each of the receiving steps on a downstream channel 20 includes the step of extracting the inserted sequential portions of the information from the blank intervals 32 of the sequential picture fields 28 of the television transmissions 24.

In the embodiment of the access system 10 as described above, a user at a terminal 54 may view a television transmission 24 carried on a selected downstream channel 20 and automatically retrieve information from the information source 60 relating to the contents of the television transmission 24. More specifically, it is preferable that the user agent 74 of the access system 10 have access to a commercial database 132 (as seen in FIG. 5), where the commercial database 132 includes resource location information relating to at least some portions of the television transmission 24. For example, the commercial database 132 may include a schedule of television commercials on the various downstream channels 20, and for each commercial may include a universal resource locator (URL) associated with the product and/or service advertised in the commercial. As should be understood, each URL refers to a home page or web site on the Internet that is maintained in connection with the product or service.

If a user viewing the commercial wishes to obtain more information on the product or service advertised therein, the user need only input a command to the headend server 38. For example, the command may merely be the push of a button on the input device 58, without,anything more. In response, the headend server 38 automatically acquires the URL corresponding to the commercial and retrieves the web page to which the URL refers from the information source 60. The web page may then be displayed to the user, and the user may input further access system commands or else return to viewing a television transmission 24 carried on a selected downstream channel 20. Alternatively, the URL may be transmitted to the user and stored in the memory 100 of the terminal 54. If it is envisioned that there is sufficient demand for a web page by multiple users at multiple terminals, the headend server 38 may be pre-programmed to obtain such web page in advance and cache the web page in the cache engine 78.

As was previously discussed, it is preferable that the information source 60 of the preferred embodiment of the present invention be an Internet service provider having access to the well-known Internet intercommunications network, but nevertheless one skilled in the art will recognize that other information sources may be accessed without departing from the spirit and scope of the present invention. As should be understood, depending upon the information source 60 accessed by the access system 10 of the present invention, not all of the afore-described elements are necessary. As but one example, if the information source is the application server 68 itself, the router 40 and the CSU/DSU 42 are not likely necessary.

From the foregoing description, it can be seen that the present invention comprises a new and useful access system for accessing information from a remote information source. The access system is particularly useful since it takes advantage of an already-existing television distribution system, since a user of the access system need not invest substantial resources in personal computers, modems, and the like, since a user need not be technically sophisticated, and since a user need not tie up a telephone line to obtain such information. Moreover, the equivalent baud rate of such an access system is significantly higher than that available from a conventional 28.8K baud rate telephone modem. It will be appreciated by those skilled in the art that changes could be made to the embodiment described above without departing from the broad inventive concepts thereof. For example, it may be appreciated that a personal computer (not shown) could be interfaced to the terminal 54 to provide enhanced access while still being within the spirit and scope of the present invention. It is understood, therefore, that this invention is not limited to the particular embodiment disclosed but is intended to cover modifications within the spirit and scope of the present invention as defined by the appended claims.

We claim:

1. An access system for providing interactive access to information available from an information source through a television distribution system which includes:

a television distribution network having a network headend, a plurality of terminal ends, a plurality of upstream channels, and a plurality of downstream channels, each downstream channel for carrying a television transmission, the television transmission including a plurality of sequentially transmitted picture fields, each transmitted picture field including a picture interval corresponding to a transmission of pixelated picture data and a blank interval corresponding to a transmission of no pixelated picture data, each upstream channel for carrying data transmissions to the network headend;

headend distribution equipment interfaced to the network headend of the television distribution network for distributing the television transmissions over the respective downstream channels of the television distribution network; and a plurality of terminals, each terminal being adapted to initiate terminal sessions, each terminal being interfaced to a terminal end of the television distribution network for receiving the television transmissions over the respective downstream channels of the television distribution network, each terminal also being interfaced to a display device for displaying a selected one of the television transmissions;

the access system comprising:

an input device associated with one of the terminals for inputting into the terminal a first command for the information source;

an upstream transmitter associated with the terminal and interfaced to the respective terminal end of the television distribution network for transmitting the inputted first command on an available upstream channel of the distribution network, wherein the available stream channel is selected from the plurality of upstream channels and is selected for each initiated terminal session;

a headend server associated with the headend distribution equipment, the headend server being interfaced to the information source;

an upstream receiver associated with the headend distribution equipment and interfaced to the headend server for receiving the inputted first command on the upstream channel of the distribution network and for forwarding the received first command to the headend server, the headend server transmitting a second command based on the forwarded first command to the information source, the information source transmitting the information to the headend server in response to the second command;

a blank interval inserter associated with the headend distribution equipment, the blank interval inserter being interfaced to the headend server for receiving the information from the headend server and for inserting the received information into the blank intervals of picture fields of at least one of the television transmissions; and a blank interval extractor interfaced to the terminal for extracting the inserted information from the blank intervals of the picture fields of the television transmissions, the extracted information being displayed on the display device.

2. The access system of claim 1 wherein the input device is also for inputting into the terminal a selection of one of the plurality of downstream channels for display on the display device.

3. The access system of claim 1 wherein the input device is a computer-style keyboard.

4. The access system of claim 3 wherein the terminal includes an infrared receiver interfaced thereto and wherein the keyboard includes an infrared transmitter for transmitting keystroke signals to the infrared receiver of the terminal.

5. The access system of claim 1 wherein the terminal includes an infrared receiver interfaced thereto and wherein the input device is a remote control device having an infrared transmitter for transmitting remote control signals to the infrared receiver of the terminal.

6. The access system of claim 1 wherein the transmitted information from the information source is in a first graphics form, and wherein the headend server includes a graphics processor for converting the transmitted information from the first graphics form to a second graphics form compatible with the display device.

7. The access system of claim 1 wherein each upstream channel of the television distribution network is multiplexed into a plurality of upstream slots, and wherein the terminal is assigned to at least one of the upstream slots at any one time.

8. The access system of claim 1 wherein each upstream channel of the television distribution network is multiplexed into a plurality of upstream slots, wherein at least one of the upstream slots is a session request slot for allowing any of a plurality of the terminals to request a session.

9. The access system of claim 8 wherein the session request is received by the headend server, the headend server assigning the requesting terminal to at least one of the upstream slots.

10. The access system of claim 9 wherein the headend server includes a noise detector for detecting a noise level on each of the upstream channels, the headend server re-assigning the terminal from a first upstream channel to a second upstream channel if necessary based on the noise level of the first upstream channel and the second upstream channel.

11. The access system of claim 9 wherein the headend server includes a noise detector for detecting a noise level on each of the upstream channels, the headend server directing the terminal to transmit at a higher level on the upstream channel if necessary based on the noise level of the upstream channel.

12. The access system of claim 1 comprising:

a plurality of input devices, each input device associated with one of a plurality of the terminals;

a plurality of upstream transmitters, each upstream transmitters associated with one of the plurality of the terminals; and a plurality of blank interval extractors, each blank interval extractor interfaced to one each of the plurality of the terminals;

the headend server being a centralized processor for each of the plurality of the terminals;

wherein the upstream receiver receives a plurality of inputted first commands from the plurality of terminals on the available upstream channel of the distribution network and forwards the respective received first commands to the headend server, the headend server transmits second commands based on the respective forwarded first commands to the information source, the information source transmits the information to the headend server in response to the respective second commands, each second command causing respective information to be transmitted from the information source, the blank interval inserter receives the respective information from the headend server and inserts the received respective information into the blank intervals of the picture fields of at least one of the television transmissions, and each of the blank interval extractors in the respective terminals extracts the respective inserted information from the blank intervals of the picture fields of the television transmissions.

13. An access system for providing interactive access to information available from an information source through a television distribution system which includes:

a television distribution network having a network headend, a plurality of terminal ends, a plurality of upstream channels, and a plurality of downstream channels, each downstream channel for carrying a television transmission, the television transmission including a plurality of sequentially transmitted picture fields, each transmitted picture field including a picture interval corresponding to a transmission of pixelated picture data and a blank interval corresponding to a transmission of no pixelated picture data, each upstream channel for carrying data transmissions to the network headend;

headend distribution equipment interfaced to the network headend of the television distribution network for distributing the television transmissions over the respective downstream channels of the television distribution network; and a plurality of terminals, each terminal being interfaced to a terminal end of the television distribution network for receiving the television transmissions over the respective downstream channels of the television distribution network, each terminal also being interfaced to a display device for display a selected one of the television transmissions;

the access system comprising:

an input device associated with one of the terminals for inputting into the terminal a first command for the information source;

an upstream transmitter associated with the terminal and interfaced to the respective terminal end of the television distribution network for transmitting the inputted first command on an upstream channel of the distribution network;

a headend server associated with the headend distribution equipment, the headend server being interfaced to the information source;

an upstream receiver associated with the headend distribution equipment and interfaced to the headend server for receiving the inputted first command on the upstream channel of the distribution network and for forwarding the received first command to the headend server, the headend server transmitting a second command based on the forwarded first command to the information to the source, the information source transmitting the information to the headend server in response to the second command;

a blank interval inserter associated with the headend distribution equipment, the blank interval inserter being interfaced to the headend server for receiving the information from the headend server and for inserting the received information into the blank intervals of picture field of at least one of the television transmissions; and a blank interval extractor interfaced to the terminal for extracting the inserted information from the blank intervals of the picture fields of the television transmissions, the extracted information being displayed on the display device, wherein the headend server includes a screen renderer for rendering screens for display at the display device interfaced to the terminal, the information inserted into the blank intervals of the picture fields being the rendered screen displays, and wherein the extracted information displayed on the display device includes the rendered screens.

14. A method for providing interactive access to information available from an information source through a television distribution system which includes:

a television distribution network having a network headend, a plurality of terminal ends, a plurality of upstream channels, and a plurality of downstream channels, each downstream channel for carrying a television transmission, the television transmission including a plurality of sequentially transmitted picture fields, each transmitted picture field including a picture interval corresponding to a transmission of pixelated picture data and a blank interval corresponding to a transmission of no pixelated picture data, each upstream channel for carrying data transmissions to the network headend;

headend distribution equipment interfaced to the network headend of the television distribution network for distributing the television transmissions over the respective downstream channels of the television distribution network; and a plurality of terminals, each terminal being adapted to initiate terminal sessions, each terminal being interfaced to a terminal end of the television distribution network for receiving the television transmissions over the respective downstream channels of the television distribution network, each terminal also being interfaced to a display device for displaying a selected one of the television transmissions;

the method comprising the steps of:

inputting a first command for the information source into one of the terminals;

transmitting the inputted first command from the terminal that received the inputted first command on an available upstream channel of the distribution network, wherein the available upstream channel is selected from the plurality of upstream channels and is selected for each initiated terminal session;

receiving the inputted first command on the upstream channel of the distribution network at the headend of the television distribution network;

forwarding the received first command to a headend server at the headend;

transmitting a second command based on the forwarded first command from the headend server to the information source;

transmitting information from the information source to the headend server in response to the second command;

inserting the information from the headend server into the blank intervals of picture fields of at least one of the television transmissions, the inserting step being performed at the headend, the inserted information being based on the transmitted information;

extracting the inserted information from the blank intervals of the picture fields of the television transmissions, the extracting step being performed at the terminal; and displaying the extracted information on the display device.

15. The method of claim 14 wherein the inputting step comprises transmitting keystroke signals from an infrared transmitter interfaced with a computer-style keyboard to an infrared receiver interfaced with the terminal.

16. The method of claim 14 wherein the inputting step comprises transmitting remote control signals from an infrared transmitter interfaced with a remote control device to an infrared receiver interfaced with the terminal.

17. The method of claim 14 wherein the transmitted information from the information source is in a first graphics form, the method further including the step of converting the transmitted information from the first graphics form to a second graphics form compatible with the display device.

18. The method of claim 14 further comprising the steps of:

multiplexing each upstream channel of the television distribution network into a plurality of upstream slots; and assigning the terminal to at least one of the upstream slots at any one time.

19. The method of claim 14 further comprising the steps of:

multiplexing each upstream channel of the television distribution network into a plurality of upstream slots, at least one of the upstream slots is a session request slot; and transmitting a session request on the session request slot by any of a plurality of the terminals.

20. The method of claim 19 further comprising the steps of:

receiving the session request by the headend server; and assigning, by the headend server, the requesting terminal to at least one of the upstream slots.

21. The method of claim 20 further comprising the steps of:

detecting a noise level on each of the upstream channels; and re-assigning the terminal from a first upstream channel to a second upstream channel if necessary based on the noise level of the first upstream channel and the second upstream channel.

22. The method of claim 20 further comprising the steps of:

detecting a noise level on each of the upstream channels; and directing the terminal to transmit at a higher level on the upstream channel if necessary based on the noise level of the upstream channel.

23. The method of claim 14 further comprising the steps of:

inputting a plurality of first commands for the information source into a respective plurality of the terminals;

transmitting each of the plurality of first commands from the respective terminal that received the inputted first command on an available upstream channel of the distribution network;

receiving the plurality of first commands on the available upstream channel of the distribution network and forwarding the respective received first commands to the headend server;

centrally processing each of the plurality of first commands at the headend server;

transmitting second commands based on the respective forwarded first commands from the headend server to the information source;

transmitting information from the information source to the headend server in response to the respective second commands, each second command causing respective information to be transmitted from the information source;

inserting the respective information from the headend server into the blank intervals of picture fields of at least one of the television transmissions, the inserting step being performed at the headend;

extracting the respective inserted portions of the information from the blank intervals of the picture fields of the television transmissions, the extracting step being performed at the respective terminals.

24. The method of claim 23 further comprising the steps of:

sending a command from a first terminal to the headend server, the command being a message; and routing the message from the headend server to a second terminal.

25. A method for providing interactive access to information available from an information source through a television distribution system which includes:

television distribution network having a network headend, a plurality of terminal ends, a plurality of upstream channels, and a plurality of downstream channels, each downstream channel for carrying television transmission, the television transmission including a plurality of sequentially transmitted picture fields, each transmitted picture field including a picture interval corresponding to a transmission of pixelated picture data and a blank interval corresponding to a transmission of no pixelated picture data, each upstream channel for carrying data transmissions to the network headend;

headend distribution equipment interfaced to the network headend of the television distribution network for distributing the television transmissions over the respective downstream channels of the television distribution network; and a plurality of terminals, each terminal being interfaced to a terminal end of the television distribution network for receiving the television transmissions over the respective downstream channels of the television distribution network, each terminal also being interfaced to a display device for displaying a selected one of the television transmissions;

the method comprising the steps of:

inputting a first command for the information source into one of the terminals;

transmitting the inputted first command from the terminal that received the inputted first command on an upstream channel of the distribution network;

receiving the inputted first command on the upstream channel of the distribution network at the headend of the television distribution network;

forwarding the received first command to a headend server at the headend;

transmitting a second command based on the forwarded first command from the headend server to the information source;

transmitting information from the information source to the headend server in response to the second command;

inserting the information from the headend server into the blank intervals of picture fields of at least one of the television transmissions, the inserting step being performed at the headend, the inserted information being based on the transmitted information;

extracting the inserted information from the blank intervals of the picture fields of the television transmissions, the extracting step being performed at the terminal;

displaying the extracted information on the display device; and rendering screens at the headend server for display at the display device interfaced to the terminal, the information inserted into the blank intervals of the picture fields being the rendered screen displays.

26. The method of claim 14 wherein a user at a terminal views a television transmission carried on a selected downstream channel, the method further comprising the steps of:

determining that the user wishes to obtain information in connection with a portion of the television transmission by the reception of an inputted command from the terminal;

accessing a database which includes resource location information relating to the portion of the television transmission and retrieving such resource location information;

retrieving resource information from the information source based on the resource location information;

displaying the resource information to the user.

27. The method of claim 26 further comprising the step of pre-caching the resource information prior to the determining step.

28. A method for providing real-time interactive access in a television distribution system which includes:

a television distribution network having a network headend, a plurality of terminal ends, a plurality of upstream channels, and a plurality of downstream channels, each downstream channel for carrying a television transmission;

headend distribution equipment interfaced to the network headend of the television distribution network for distributing the television transmissions over the respective downstream channels of the television distribution network; and a plurality of terminals, each terminal being interfaced to a terminal end of the television distribution network for receiving the television transmissions over the respective downstream channels of the television distribution network, each terminal also being interfaced to a display device for displaying a selected one of the television transmissions;

the method comprising the steps of:
inputting first data into one of the terminals;
repeatedly transmitting the inputted first data from the terminal that received the inputted first data on an upstream channel of the distribution network until an acknowledge is received by the terminal on the downstream channel of the distribution network that the inputted first data has been received;
receiving the transmitted first data on the upstream channel of the distribution network at the headend distribution equipment;
transmitting a first acknowledgement of the received first data from the headend distribution equipment on a downstream channel of the distribution network;
receiving the transmitted first acknowledgement on the downstream channel of the distribution network at the terminal;
transmitting second data from the headend distribution equipment on a downstream channel of the distribution network;
receiving the transmitted second data on the downstream channel of the distribution network at the terminal;
transmitting a second acknowledgement of the received second data from the terminal on an upstream channel of the distribution network; and
receiving the transmitted second acknowledgement on the upstream channel of the distribution network at the headend distribution equipment.

29. The method of claim 28 wherein the television transmission on each downstream channel of the television distribution network includes a plurality of sequentially transmitted picture fields, each transmitted picture field including a picture interval corresponding to a transmission of pixelated picture data and a blank interval corresponding to a transmission of no pixelated picture data, each upstream channel for carrying data transmissions to the network headend;

wherein each of the transmitting steps on a downstream channel includes the step of inserting sequential portions of information into the blank intervals of sequential picture fields of at least one of the television transmissions; and wherein each of the receiving steps on a downstream channel includes the step of extracting the inserted sequential portions of the information from the blank intervals of the sequential picture fields of the television transmissions.

30. An access system for providing interactive access to information available from an information source through a television distribution system which includes;

a television distribution network having a network headend, a plurality of terminal ends, a plurality of upstream channels, and a plurality of downstream channels, each downstream channel for carrying a television transmission;

headend distribution equipment interfaced to the network headend of the television distribution network for distributing the television transmissions over the respective downstream channels of the television distribution network; and a plurality of terminals, each terminal being interfaced to a terminal end of the television distribution network for receiving the television transmissions over the respective downstream channels of the television distribution network, each terminal also being interfaced to a display device for displaying a selected one of the television transmissions;

the access system comprising:
an input device associated with one of the terminals for inputting into the terminal a first command for the information source;
an upstream transmitter associated with the terminal and interfaced to the respective terminal end of the television distribution network for transmitting the inputted first command as well as information identifying the terminal that received the inputted first command on an upstream channel of the distribution network;
a headend server associated with the headend distribution equipment, the headend server being interfaced to the information source;
an upstream receiver associated with the headend distribution equipment and interfaced to the headend server for receiving the inputted first command and the terminal identifying information on the upstream channel of the distribution network and for forwarding the received first command and the terminal identifying information to the headend server, the headend server transmitting a second command based on the forwarded first command to the information source, the information source transmitting the information to the headend server in response to the second command;
a downstream transmitter interfaced to the headend server for receiving information based on the transmitted information from the headend server and for transmitting the received information on any available downstream channel to the terminal that receive the inputted first command upon the terminal identifying information; and
a downstream receiver interfaced to the terminal for receiving the transmitted information on the downstream channel as terminal information, the terminal information being displayed on the display device;
the headend server including a screen renderer for rendering screens for display at the display device interfaced to the terminal, the terminal information including the rendered screens.

31. An access system for providing interactive access to information available from an information source through television distribution system which includes:

a television distribution network having a network headend, a plurality of terminal ends, a plurality of upstream channels, and a plurality of downstream channels, each downstream channel for carrying a television transmission;

headend distribution equipment interfaced to the network headend of the television distribution network for distributing the television transmissions over the respective downstream channels of the television distribution network; and a plurality of terminals, each terminal being interfaced to a terminal end of the television distribution network for receiving the television transmissions over the respective downstream channels of the television distribution network, each terminal also being interfaced to a display device for displaying a selected one of the television transmissions;

the access system comprising:

an input device associated with one of the terminals for inputting into the terminal a first command for the information source;

an upstream transmitter associated with the terminal and interfaced to the respective terminal end of the television distribution network for transmitting the inputted first command on an upstream channel of the distribution network;

a headend server associated with the headend distribution equipment, the headend server being interfaced to the information source;

an upstream receiver associated with the headend distribution equipment and interfaced to the headend server for receiving the inputted first command on the upstream channel of the distribution network and for forwarding the received first command to the headend server, the headend server transmitting a second command based on the forwarded first command to the information source, the information source transmitting the information to the headend server in response to the second command;

a downstream transmitter interfaced to the headend server for receiving information based on the transmitted information from the headend server and for transmitting the received information on a downstream channel; and a downstream receiver interfaced to the terminal for receiving the transmitted information on the downstream channel as terminal information, the terminal information being displayed on the display device;

the headend server including a screen renderer for rendering screens for display at the display device interfaced to the terminal, the terminal information including the rendered screens, wherein the screen renderer generates refresh information corresponding to changes to be made to a screen, wherein the downstream transmitter receives the refresh information and transmits the refresh information on a downstream channel, wherein the downstream receiver receives the transmitted refresh information on the downstream channel, and wherein the refresh information is employed by the terminal to perform changes to the screen.

32. A method for providing interactive access to information available from an information source through a television distribution system which includes:

a television distribution network having a network headend, a plurality of terminal ends, a plurality of upstream channels, and a plurality of downstream channels, each downstream channel for carrying a television transmission;

headend distribution equipment interfaced to the network headend of the television distribution network for distributing the television transmissions over the respective downstream channels of the television distribution network; and a plurality of terminals, each terminal being interfaced to a terminal end of the television distribution network for receiving the television transmissions over the respective downstream channels of the television distribution network, each terminal also being interfaced to a display device for displaying a selected one of the television transmissions;

the method comprising the steps of:

inputting a first command for the information source into one of the terminals;

transmitting the inputted first command from the terminal that received the inputted first command and information identifying the terminal that received the inputted first command on an upstream channel of the distribution network;

receiving the inputted first command and the terminal identifying information on the upstream channel of the distribution network at the headend of the television distribution network;

forwarding the received first command and the terminal identifying information to a headend server at the headend;

transmitting a second command based on the forwarded first command from the headend server to the information source;

transmitting information from the information source to the headend server in response to the second command;

rendering a screen at the headend server based on the transmitted information from the information source, the rendered screen for display at the display device interfaced to the terminal;

transmitting information including the rendered screen from the headend server on any available downstream channel to the terminal that received the inputted first command based upon the terminal identifying information;

receiving the transmitted information on the downstream channel at the terminal; and displaying the rendered screen on the display device.

33. A method for providing interactive access to information available from an information source through a television distribution system which includes:

a television distribution network having a network headend, a plurality of terminal ends, a plurality of upstream channels, and plurality of downstream channels, each downstream channel for carrying a television transmission;

headend distribution equipment interfaced to the network headend of the television distribution network for distributing the television transmissions over the respective downstream channels of the television distribution network; and a plurality of terminals, each terminal being interfaced to a terminal end of the television distribution network for receiving the television transmissions over the respective downstream channels of the television distribution network, each terminal also being interfaced to a display device for displaying a selected one of the television transmissions;

the method comprising the steps of:
  inputting a first command for the information source into one of the terminals;
  transmitting the inputted first command from the terminal that received the inputted first command on an upstream channel of the distribution network;
  receiving the inputted first command on the upstream channel of the distribution network at the headend of the television distribution network;
  forwarding the received first command to a headend server at the headend;
  transmitting a second command based on the forwarded first command from the headend server to the information source;
  transmitting information from the information source to the headend server in response to the second command;
  rendering a screen at the headend server based on the transmitted information from the information source, the rendered screen for display at the display device interfaced to the terminal;
  transmitting information including the rendered screen from the headend server on a downstream channel;
  receiving the transmitted information on the downstream channel at the terminal;
  displaying the rendered screen on the display device;
  rendering refresh information corresponding to changes to be made to a screen;
  transmitting the refresh information on a downstream channel;
  receiving the transmitted refresh information on the downstream channel; and
  performing changes to the screen based on the refresh information.

34. A method for providing interactive access to an information source through a television distribution system which includes:
  a television distribution network having a network headend, a plurality of terminal ends, a plurality of upstream channels, and a plurality of downstream channels, each downstream channel for carrying a television transmission;
  headend distribution equipment interfaced to the network headend of the television distribution network for distributing the television transmissions over the respective downstream channels of the television distribution network; and
  a plurality of terminals, each terminal being interfaced to a terminal end of the television distribution network for receiving the television transmissions over the respective downstream channels of the television distribution network, each terminal also being interfaced to a display device for displaying a selected one of the television transmissions;
  the method comprising the steps of:
    inputting a command into one of the terminals to signify that a user at the terminal wishes to obtain information in connection with a portion of a displayed television transmission;
    transmitting the inputted command from the inputted-into terminal on an upstream channel of the distribution network;
    receiving the inputted command on the upstream channel of the distribution network at the headend of the television distribution network;
    accessing a database which includes resource location information relating to the portion of the television transmission and retrieving such resource location information;
    retrieving resource information from the information source based on the resource location information;
    transmitting the retrieved resource information on a downstream channel;
    receiving the transmitted resource information on the downstream channel at the terminal; and
    displaying the resource information on the display device.

35. A method for providing interactive access to an information source through a television distribution system which includes:
  a television distribution network having a network headend, a plurality of terminal ends, a plurality of upstream channels, and a plurality of downstream channels, each downstream channel for carrying a television transmission;
  headend distribution equipment interfaced to the network headend of the television distribution network for distributing the television transmissions over the respective downstream channels of the television distribution network; and
  a plurality of terminals, each terminal being interfaced to a terminal end of the television distribution network for receiving the television transmissions over the respective downstream channels of the television distribution network, each terminal also being interfaced to a display device for displaying a selected one of the television transmissions;
  the method comprising the steps of:
    inputting a command into one of the terminals to signify that a user at the terminal wishes to obtain information in connection with a portion of a displayed television transmission;
    transmitting the inputted command from the inputted-into terminal on an upstream channel of the distribution network;
    receiving the inputted command on the upstream channel of the distribution network at the headend of the television distribution network;
    accessing a database which includes resource location information relating to the portion of the television transmission and retrieving such resource location information;
    transmitting the retrieved resource location information on a downstream channel; and
    receiving the transmitted resource location information on the downstream channel at the terminal.

36. The access system of claim 1 wherein the transmitted information from the information source is in multi-media form including one or more video, audio, graphics, still images, and text, and wherein the headend server includes a multi-media processor for converting the transmitted information from a first multi-media form to a second multi-media form compatible with the display device.

37. The access system of claim 1 wherein the blank interval inserter inserts the received information into the blank intervals of sequential picture fields of at least one of the television transmissions, and
  the blank interval extractor extracts the information from the sequential picture fields.

38. The method of claim 14 wherein the inserting step includes inserting the information into the blank intervals of sequential picture fields of at least one of the television transmissions, and
  the extracting step includes extracting the information from the sequential picture fields.

39. An access system for providing interactive access to information available from an Internet Service Provider (ISP) through a television distribution system which includes:

a television distribution network having a network headend, a plurality of terminal ends, a plurality of upstream channels, and a plurality of downstream channels, each downstream channel for carrying a television transmission, the television transmission including a plurality of sequentially transmitted picture fields, each transmitted picture field including a picture interval corresponding to a transmission of pixelated picture data and a blank interval corresponding to a transmission of no pixelated picture data, each upstream channel for carrying data transmissions to the network headend;

headend distribution equipment interfaced to the network headend of the television distribution network for distributing the television transmissions over the respective downstream channels of the television distribution network; and a plurality of terminals, each terminal being interfaced to a terminal end of the television distribution network for receiving the television transmissions over the respective downstream channels of the television distribution network, each terminal also being interfaced to a display device for displaying a selected one of the television transmissions;

the access system comprising:

an input device associated with one of the terminals for inputting a terminal command into the terminal;

an upstream transmitter associated with the terminal and interfaced to the respective terminal end of the television distribution network for transmitting the inputted terminal command on an upstream channel of the distribution network;

a headend server associated with the headend distribution equipment;

an Internet router for allowing communication between the headend server and an ISP, the Internet router transmitting Internet commands from the headend server to the ISP, and transmitting information from the ISP to the headend server;

an upstream receiver associated with the headend distribution equipment and interfaced to the headend server for receiving the terminal command on the upstream channel of the distribution network and for forwarding the terminal command to the headend server, the headend server transmitting an Internet command to the ISP via the Internet router in response to the terminal command, the ISP transmitting the information to the headend server via the Internet router in response to the Internet command;

a blank interval inserter associated with the headend distribution equipment, the blank interval inserter being interfaced to the headend server for receiving the information from the headend server and for inserting the received information into the blank intervals of the picture fields of at least one of the television transmissions; and a blank interval extractor interfaced to the terminal for extracting the inserted information front the blank intervals of the picture fields of the television transmissions, the extracted information being displayed on the display device.

40. The access system of claim 39 wherein the terminal command is interpreted by the headend server as a request for a specific web page.

41. The access system of claim 39 wherein the terminal command is converted by the headend server into an Internet command.

42. The access system of claim 39 wherein the headend server includes a screen renderer for rendering screens for display at the display device interfaced to the terminal, the information inserted into the blank intervals of the picture fields being the rendered screen displays, and wherein the extracted information displayed on the display device includes the rendered screens.

43. A method for providing interactive access to information available from an Internet Service Provider (ISP) through a television distribution system which includes:

a television distribution network having a network headend, a plurality of terminal ends, a plurality of upstream channels, and a plurality of downstream channels, each downstream channel for carrying a television transmission, the television transmission including a plurality of sequentially transmitted picture fields, each transmitted picture field including a picture interval corresponding to a transmission of pixelated picture data and a blank interval corresponding to a transmission of no pixelated picture data, each upstream channel for carrying data transmissions to the network headend;

headend distribution equipment interfaced to the network headend of the television distribution network for distributing the television transmissions over the respective downstream channels of the television distribution network; and a plurality of terminals, each terminal being interfaced to a terminal end of the television distribution network for receiving the television transmissions over the respective downstream channels of the television distribution network, each terminal also being interfaced to a display device for displaying a selected one of the television transmissions;

the method comprising the steps of:

inputting a terminal command for the ISP into one of the terminals;

transmitting the inputted terminal command from the terminal on an upstream channel of the distribution network;

receiving the terminal command on the upstream channel of the distribution network at the headend of the television distribution network;

forwarding the received terminal command to a headend server at the headend;

transmitting an Internet command based on the forwarded terminal command from the headend server to the ISP via an Internet router interfaced to the headend server;

transmitting information from the ISP to the headend server in response to the Internet command via the Internet router;

inserting the information from the headend server into the blank intervals of picture fields of at least one of the television transmissions, the inserting step being performed at the headend, the inserted information being based on the transmitted information;

extracting the inserted portions of the information from the blank intervals of the picture fields of the television transmissions, the extracting step being performed at the terminal; and displaying the extracted information on the display device.

44. The method of claim 43 further comprising the step of:

the headend interpreting the terminal command as a request for a specific web page.

45. The method of claim 43 further comprising the step of:
the headend converting the terminal command into an Internet command.

46. The method of claim 44 further comprising the step of rendering screens at the headend server for display at the display device interfaced to the terminal, the information inserted into the blank intervals of the picture fields being the rendered screen displays.

47. The access system of claim 1 wherein the headend server which is interfaced with the information source receives information therefrom which is different in content than the content of the television transmissions.

48. The method of claim 14 wherein in the information transmitting step, the information from the information source is different in content than the content of the television transmissions.

49. The access system of claim 30 wherein the headend server which is interfaced with the information source receives information therefrom which is different in content than the content of the television transmissions.

50. The method of claim 32 wherein in the information transmitting step, the information from the information source is different in content than the content of the television transmissions.

51. The access system of claim 39 wherein the information transmitted from the ISP is different in content than the content of the television transmissions.

52. The method of claim 43 wherein the information from the ISP is different in content than the content of the television transmissions.

53. The access system of claim 30 wherein the information transmitted by the downstream transmitter comprises the rendered screens.

54. The access system of claim 1 wherein the upstream transmitter also transmits information identifying the terminal that received the inputted first command and wherein the upstream receiver receives such terminal identifying information and forwards the same to the headend server to facilitate the transmission of the information from the information source to the terminal that received the inputted first command.

55. The method of claim 14 wherein the step of transmitting the inputted first command on an upstream channel further comprises transmitting information identifying the terminal that received the inputted first command on the upstream channel; and the step of receiving the inputted first command on the upstream channel further comprises receiving information identifying the terminal that received the inputted first command on the upstream channel at the headend of the television distribution network, wherein the information identifying the terminal is used to facilitate the transmission of the information from the information source to the terminal that received the inputted first command.

56. The method of claim 34 wherein:

the step of transmitting the inputted first command on an upstream channel further comprises transmitting information identifying the terminal that received the inputted first command on the upstream channel;

the step of receiving the inputted first command on the upstream channel further comprises receiving information identifying the terminal that received the inputted first command on the upstream channel at the headend of the television distribution network; and the step of transmitting the retrieved resource information on a downstream channel further comprises transmitting information identifying the terminal that received the inputted first command on the downstream channel.

57. The access system of claim 1 wherein the blank interval inserter inserts the received information into the blank intervals of picture fields of any available television transmission, the received information thereby being transmitted to the terminal on any available downstream channel.

58. The method of claim 14 wherein the inserting step includes inserting the information into the blank intervals of picture fields of any available television transmission, the information thereby being transmitted to the terminal on any available downstream channel.

* * * * *

UNITED STATES PATENT AND TRADEMARK OFFICE
CERTIFICATE OF CORRECTION

PATENT NO. : 5,999,970
DATED : December 7, 1999
INVENTOR(S) : Harold M. Krisbergh et al.

It is certified that error appears in the above-identified patent and that said Letters Patent is hereby corrected as shown below:

<u>Title page,</u>
Item [75] Inventors: Add -- David A. Dill --

Signed and Sealed this

Sixteenth Day of October, 2001

*Attest:*

NICHOLAS P. GODICI
*Attesting Officer*     *Acting Director of the United States Patent and Trademark Office*